United States Patent [19]

Sakaue

[11] Patent Number: 6,124,867
[45] Date of Patent: Sep. 26, 2000

[54] PICTURE OUTPUT APPARATUS, PICTURE PREPARATION APPARATUS, AND PICTURE OUTPUT METHOD FOR OUTPUTTING PICTURE IN THE STATE DEVELOPED INTO BITMAP DATA

[75] Inventor: Eiichi Sakaue, Yokohama, Japan

[73] Assignee: Kabushiki Kaisha Toshiba, Kawasaki, Japan

[21] Appl. No.: 08/683,862

[22] Filed: Jul. 17, 1996

[30] Foreign Application Priority Data

Jul. 18, 1995 [JP] Japan ................................. 7-181616

[51] Int. Cl.$^7$ ................................. G06F 12/00
[52] U.S. Cl. ................................. 345/511; 345/515
[58] Field of Search ................................. 345/154, 155, 345/192, 201, 511, 113, 115, 435, 186, 515; 395/108

[56] References Cited

U.S. PATENT DOCUMENTS

| | | |
|---|---|---|
| 4,491,836 | 1/1985 | Collmeyer et al. ................ 340/747 |
| 5,208,908 | 5/1993 | Harrison et al. ................... 395/150 |
| 5,367,674 | 11/1994 | Berk et al. ........................ 395/600 |
| 5,559,952 | 9/1996 | Fujimoto .......................... 395/164 |
| 5,696,698 | 12/1997 | Herluison et al. ................. 364/514 |

FOREIGN PATENT DOCUMENTS

| | | |
|---|---|---|
| 0 578 256 | 1/1994 | European Pat. Off. . |
| 0 646 859 | 4/1995 | European Pat. Off. . |
| 5-143045 | 6/1993 | Japan . |

OTHER PUBLICATIONS

Patent Abstracts of Japan, vol. 018, No. 561 (P–1818), Oct. 26, 1994 & JP–A–06 202826 (Fuji Xerox Co. Ltd.), Jul. 22, 1994).

Patents Abstracts of Japan, vol. 018, No. 561 (P–1818), Oct. 26, 1994 & JP–A–06 202826 (Fuji Xerox Co. Ltd), Jul. 22, 1994.

*Primary Examiner*—Matthew Luu
*Assistant Examiner*—Jeff Piziali
*Attorney, Agent, or Firm*—Foley & Lardner

[57] ABSTRACT

A picture output apparatus capable of carrying out picture output at a high speed is provided. In the picture output apparatus adapted for converting picture data of a first form, which is not permitted to undergo picture output, inputted along with a picture output instruction into picture data of a second form which is permitted to undergo picture output, wherein this apparatus comprises a configuration to convert picture data of the first form inputted without the picture output instruction into picture data of the second form to hold it as predictive picture data of the second form with respect to picture data of the first form predicted to be inputted along with the picture output instruction later. In the case where the picture data of the first form inputted along with the picture output instruction and the previously inputted picture data of the first form are the same, since the picture data of the second form already exists, it is possible to carry out picture output without conversion processing. In the case where difference is small even if both picture data are not the same, it is sufficient to convert only where the difference occurs.

6 Claims, 16 Drawing Sheets

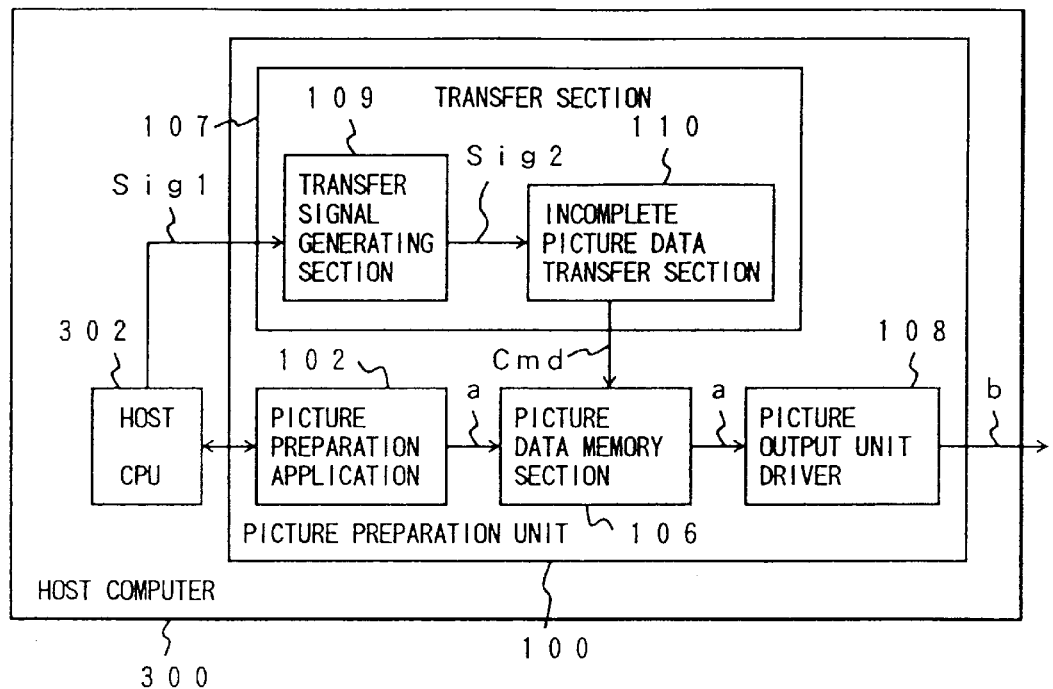
F I G. 1 A
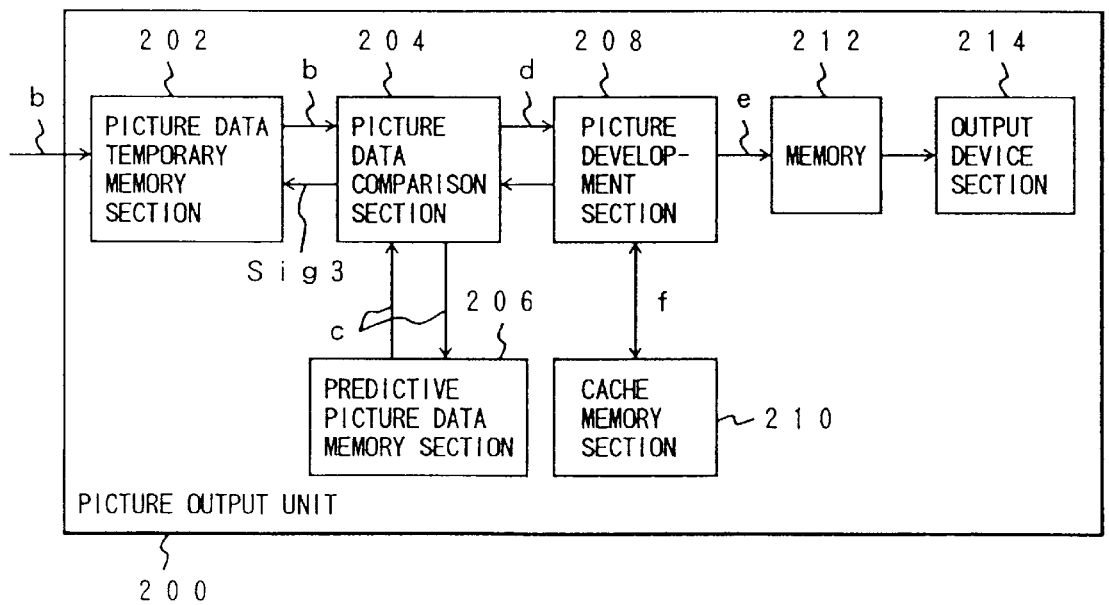
F I G. 1 B

```
PAGE FORMAT

CHARACTER CODE 1 (CHARACTER, POSITION, SIZE, ATTRIBUTE, etc)
GRAPHIC COMMAND 1 (KIND, POSITION, SIZE, ATTRIBUTE, etc)
GRAPHIC COMMAND 2 (KIND, POSITION, SIZE, ATTRIBUTE, etc)
CHARACTER CODE 2 (CHARACTER, POSITION, SIZE, ATTRIBUTE, etc)
CHARACTER CODE 3 (CHARACTER, POSITION, SIZE, ATTRIBUTE, etc)
                            ⋮
IMAGE DATA 1 (POSITION, SIZE, etc, DATA TRAIN)
```

```
PAGE ATTRIBUTE
CHARACTER CODE 1 (CHARACTER, POSITION, SIZE, ATTRIBUTE, etc)
GRAPHIC COMMAND 1 (KIND, POSITION, SIZE, ATTRIBUTE, etc)
GRAPHIC COMMAND 2 (KIND, POSITION, SIZE, ATTRIBUTE, etc)
CHARACTER CODE 2 (CHARACTER, POSITION, SIZE, ATTRIBUTE, etc)
CHARACTER CODE 3 (CHARACTER, POSITION, SIZE, ATTRIBUTE, etc)
                            ⋮
IMAGE DATA 1 (POSITION, SIZE, etc, DATA TRAIN)
```

INCOMPLETE PICTURE DATA

F I G. 7A

```
PAGE ATTRIBUTE
CHARACTER CODE 1 (CHARACTER, POSITION, SIZE, ATTRIBUTE, etc)
GRAPHIC COMMAND 1 (KIND, POSITION, SIZE, ATTRIBUTE, etc)
GRAPHIC COMMAND 2 (KIND, POSITION, SIZE, ATTRIBUTE, etc)
CHARACTER CODE 2 (CHARACTER, POSITION, SIZE, ATTRIBUTE, etc)
                            ⋮
IMAGE DATA 1 (POSITION, SIZE, etc, DATA TRAIN)
```

PREDICTIVE DEVELOPMENT PICTURE DATA

F I G. 7B

```
PAGE ATTRIBUTE
CHARACTER CODE 1 (CHARACTER, POSITION, SIZE, ATTRIBUTE, etc)
GRAPHIC COMMAND 1 (KIND, POSITION, SIZE, ATTRIBUTE, etc)
GRAPHIC COMMAND 2 (KIND, POSITION, SIZE, ATTRIBUTE, etc)
CHARACTER CODE 2 (CHARACTER, POSITION, SIZE, ATTRIBUTE, etc)
                         ⋮
IMAGE DATA 1 (POSITION, SIZE, etc, DATA TRAIN)
```

INCOMPLETE PICTURE DATA

F I G. 8A

```
PAGE ATTRIBUTE
CHARACTER CODE 1 (CHARACTER, POSITION, SIZE, ATTRIBUTE, etc)
GRAPHIC COMMAND 1 (KIND, POSITION, SIZE, ATTRIBUTE, etc)
GRAPHIC COMMAND 2 (KIND, POSITION, SIZE, ATTRIBUTE, etc)
CHARACTER CODE 2 (CHARACTER, POSITION, SIZE, ATTRIBUTE, etc)
CHARACTER CODE 3 (CHARACTER, POSITION, SIZE, ATTRIBUTE, etc)
                         ⋮
IMAGE DATA 1 (POSITION, SIZE, etc, DATA TRAIN)
```

PREDICTIVE DEVELOPMENT PICTURE DATA

F I G. 8B

```
PAGE ATTRIBUTE
CHARACTER CODE 1 (CHARACTER, POSITION, SIZE, ATTRIBUTE, etc)
GRAPHIC COMMAND 1 (KIND, POSITION, SIZE, ATTRIBUTE, etc)
GRAPHIC COMMAND 2 (KIND, POSITION, SIZE, ATTRIBUTE, etc)
CHARACTER CODE 2 (CHARACTER, POSITION, SIZE, ATTRIBUTE, etc)
CHARACTER CODE 3 (CHARACTER, POSITION, SIZE, ATTRIBUTE, etc)
             ⋮
IMAGE DATA 1 (POSITION, SIZE, etc, DATA TRAIN)
```

INCOMPLETE PICTURE DATA

F I G. 9A

```
PAGE ATTRIBUTE
CHARACTER CODE 1 (CHARACTER, POSITION, SIZE, ATTRIBUTE, etc)
GRAPHIC COMMAND 1 (KIND, POSITION, SIZE, ATTRIBUTE, etc)
GRAPHIC COMMAND 2(CHARACTER, POSITION, SIZE, ATTRIBUTE, etc)
CHARACTER CODE 2 (CHARACTER, POSITION, SIZE, ATTRIBUTE, etc)
CHARACTER CODE 3 (CHARACTER, POSITION, SIZE, ATTRIBUTE, etc)
             ⋮
IMAGE DATA 1 (POSITION, SIZE, etc, DATA TRAIN)
```

PREDICTIVE DEVELOPMENT PICTURE DATA

F I G. 9B

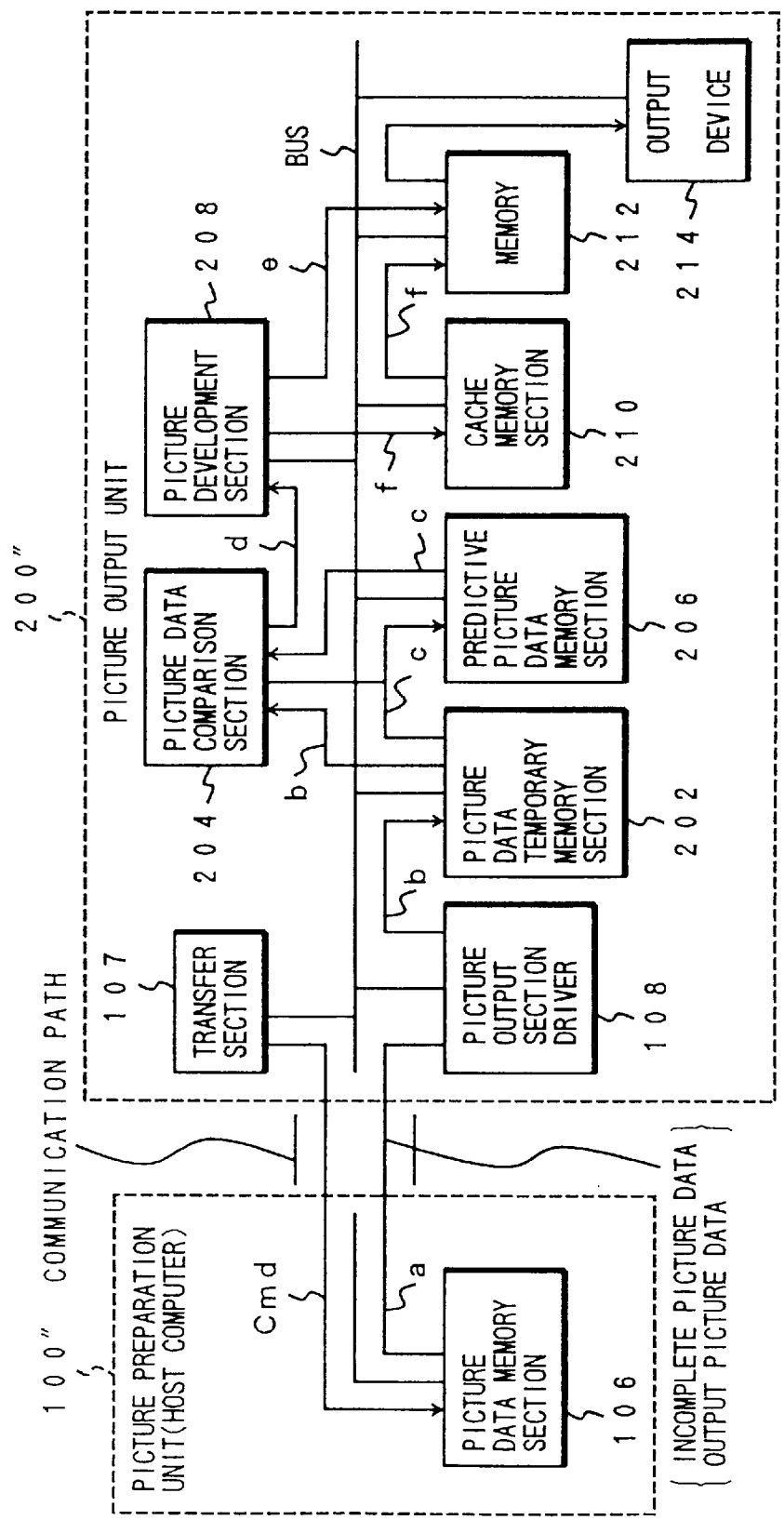
F I G. 12

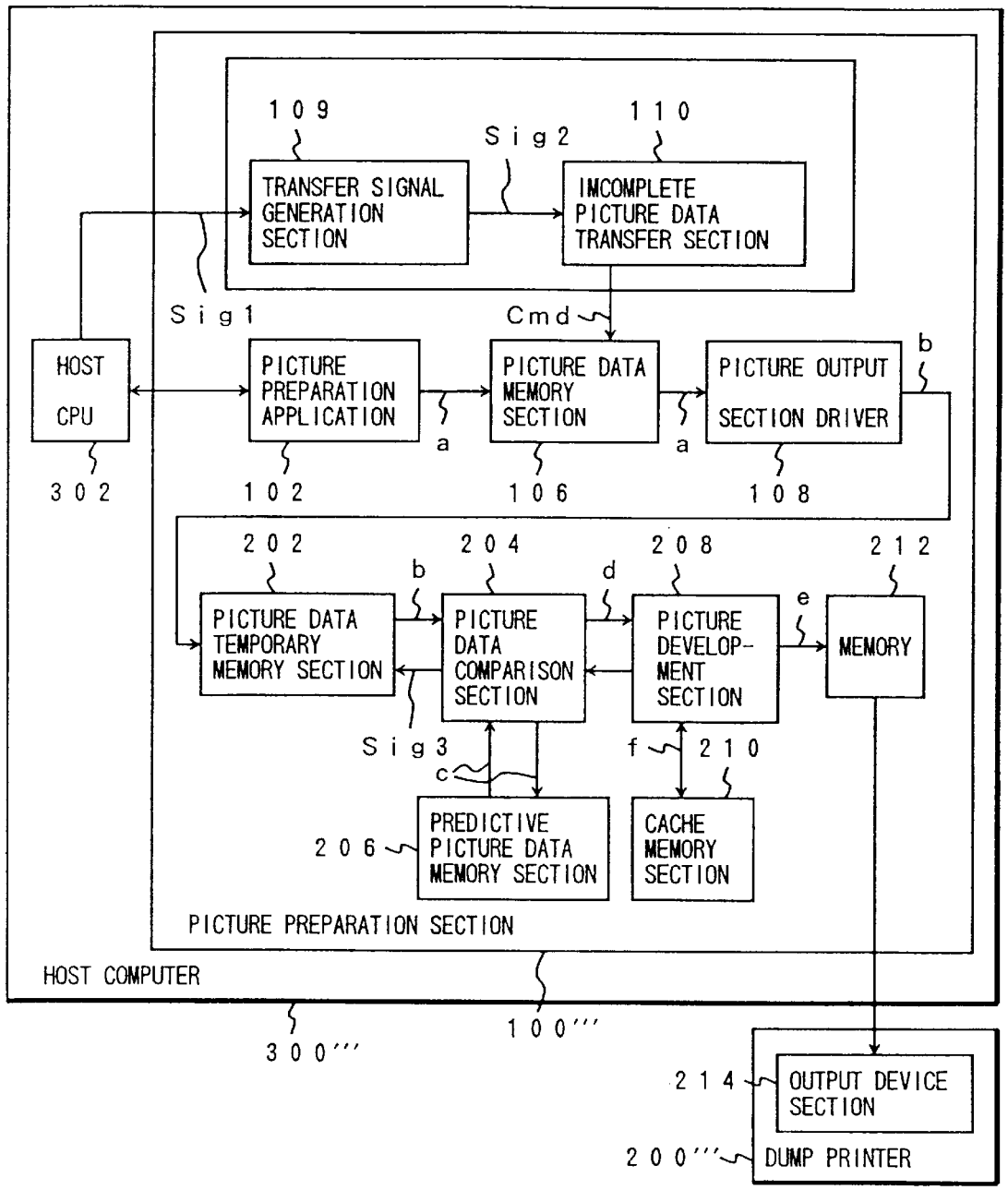
F I G. 13

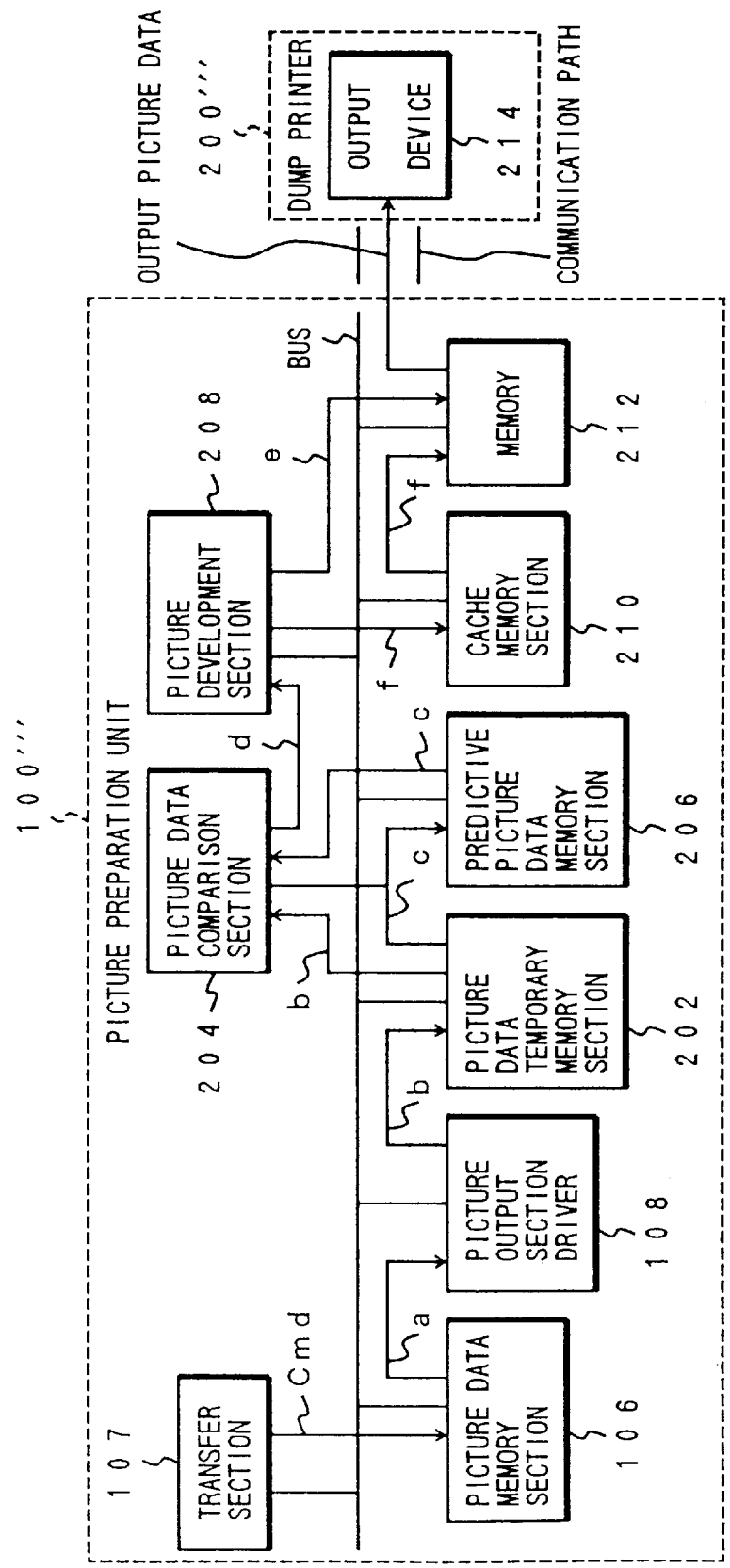
F I G. 14

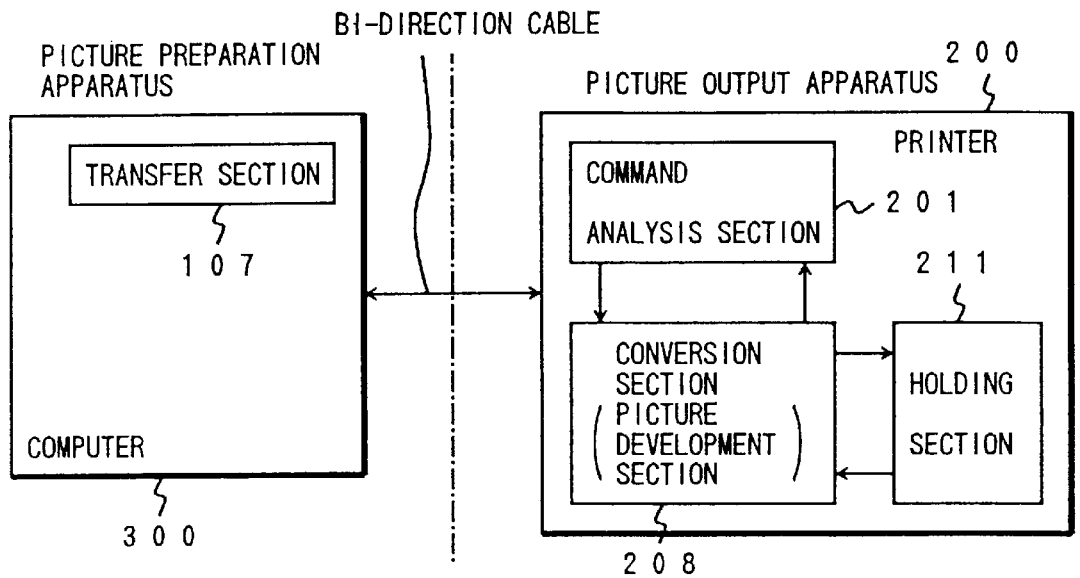
F I G. 1 6
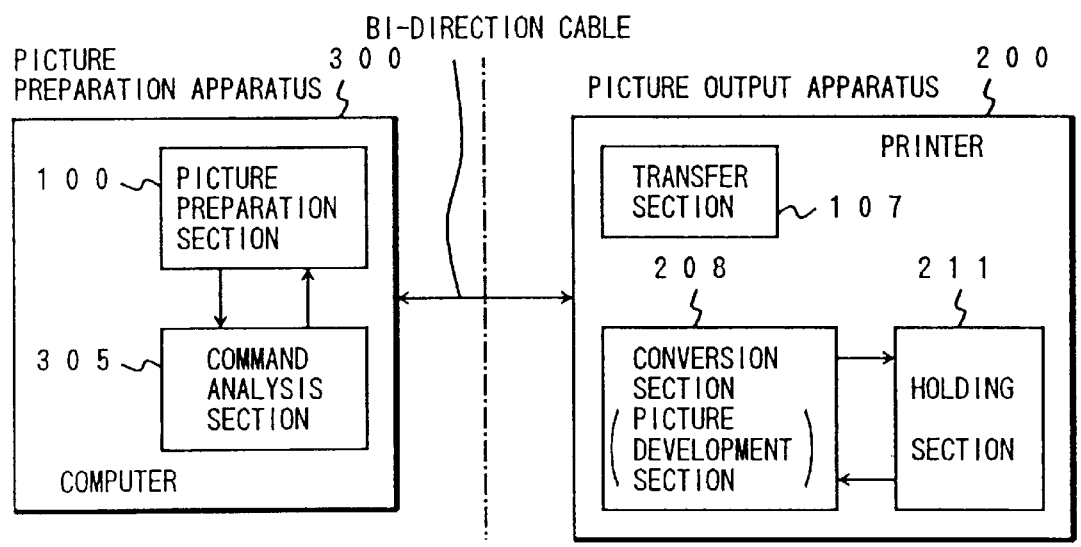
F I G. 1 7

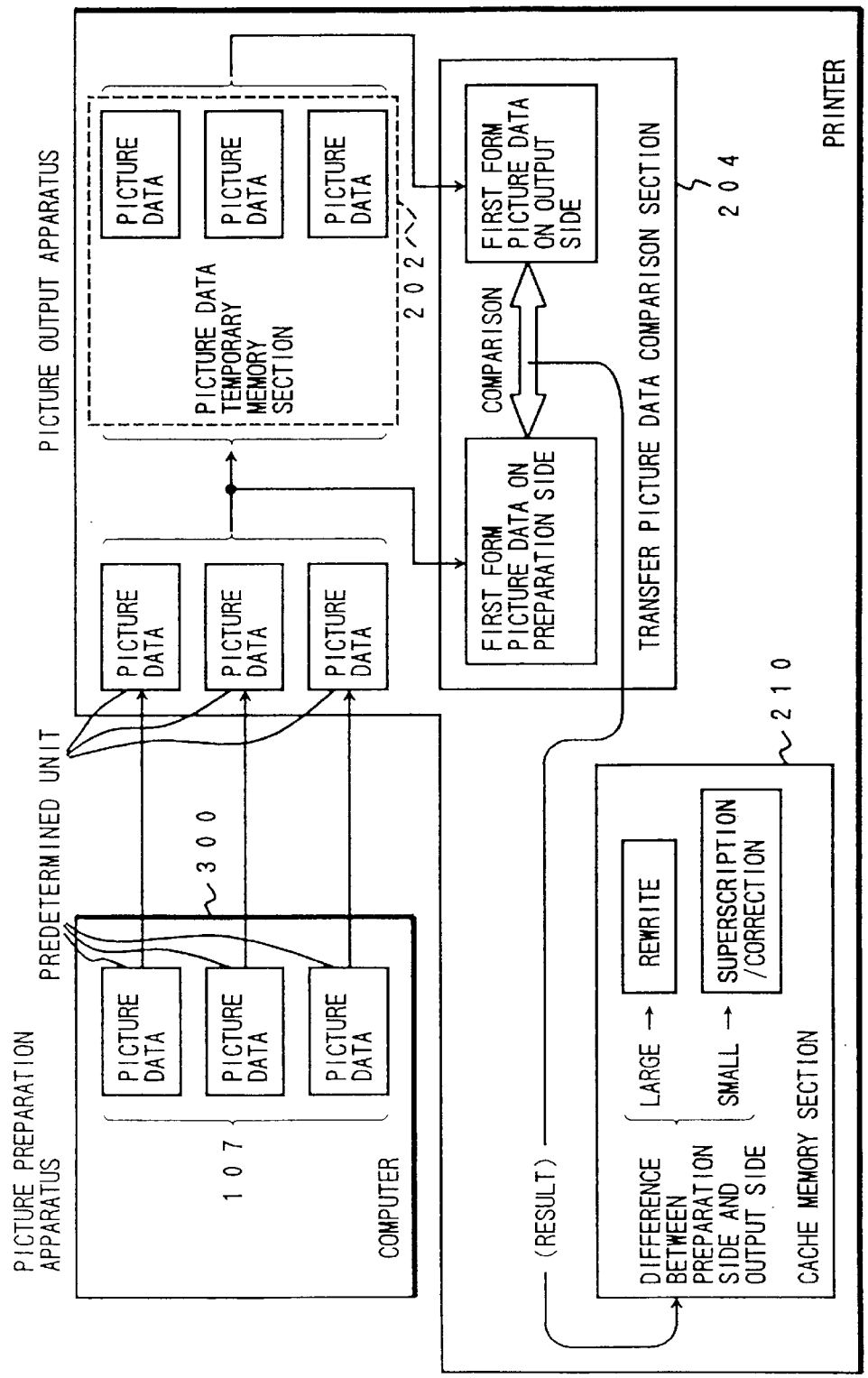
F I G. 18

PICTURE OUTPUT APPARATUS, PICTURE PREPARATION APPARATUS, AND PICTURE OUTPUT METHOD FOR OUTPUTTING PICTURE IN THE STATE DEVELOPED INTO BITMAP DATA

BACKGROUND OF THE INVENTION

This invention relates to a picture output apparatus for allowing picture data including character code, graphic command and/or image data to undergo picture output in the state developed into bitmap data.

Picture data prepared by using picture preparation application software, or any other technique on the host computer are adapted so that when user inputs picture output instruction through input device such as keyboard or mouse, etc., those picture data are transferred to a picture output unit (apparatus) as output picture data and are caused to undergo picture output. As the picture output apparatus, there are picture recording (memory) device such as printer, digital copy machine or FAX, etc., picture display device such as display, etc., and the like.

Picture data includes, as the fundamental unit, "character code", "graphic command" which is graphic description instruction such as round or square, etc., and "image data" such as natural picture described in the bitmap form, etc., and is constructed by arbitrarily combining those fundamental units.

When the picture output apparatus receives picture data consisting of character code, graphic command and/or image data, it allows this picture data to undergo development/modification (transformation) processing into data in the bitmap form suitable for output form of the picture output apparatus thereafter to sequentially write those picture data into the memory called page memory. In recent years, development/modification processing of picture data can be carried out on the OS (Operating System) by using Host computer. Also in this case, the principle is similar to the above.

The case where the picture output apparatus is printer is taken as an example. If this printer is assumed to have recording (memory) density of 600 dpi, the character code and/or the graphic command of the picture data are developed into bitmap data of the density of 600 dpi. Moreover, if the printer has color recording ability, those information are developed into bitmap data of three colors of yellow, magenta and cyan, or four colors further including black in addition to the above three colors.

In the case of image data in the bitmap form, modification (transformation) processing is implemented. In terms of the above-mentioned example, if corresponding image data has density except for 600 dpi, it is caused to undergo enlargement/compression so that it has density of 600 dpi.

Moreover, in the case where corresponding image data has gradation (tone) of 8 bits with respect to respective pixels and the gradation reproduction ability of the printer has only 3 bits with respect to respective pixels, pseudo-gradation processing such as multi-value error diffusion, etc. is implemented.

When all of character codes, graphic commands and image data belonging to one page are subjected to development/modification and write operation into the page memory is completed, the picture output apparatus serially reads out data written in the page memory from the corner of the page to send them to a picture output device. Thus, picture output is provided.

However, since development/modification processing as described above is complicated, much processing time is required. This constitutes great obstacle to high speed recording/display.

As one prior art for solving the above problem, cache is known. In accordance with the cache, an approach is employed to develop a certain character code into data in the bitmap form thereafter to write it into page memory, and to hold, at the same time, that bitmap information into a temporary memory section called cache memory. At times subsequent thereto, an approach is employed to read out, with respect to the same character code, without developing such character code, data in the bitmap form from the cache memory to write them into the page memory. Since the time required for reading out such data from the cache memory is shorter than the time required for developing character code, it is possible to write such data into the page memory at a high speed.

However, such cache function is effective only in the case where many character codes are developed in advance so that they are cached, and the time of page in a short time from start of recording/display could not be shortened.

In addition, there was the problem that the time required for enlargement/contraction of image data and/or pseudo intermediate gradation processing cannot be shortened.

Hitherto, much time is required for allowing picture data to be subjected to picture output to undergo development/modification processing so that bitmap data are provided. This constituted great obstacle to high speed picture output. In addition, the cache function was limitatively effective only in the special case.

SUMMARY OF THE INVENTION

This invention has been made in consideration of actual circumstances as described above, and its object is to provide a picture output apparatus, a picture preparation apparatus and a picture output method which can provide picture output at a high speed.

This invention is directed to a picture output apparatus adapted for converting picture data of a first form, which is not permitted to undergo picture output, inputted with picture output instruction into picture data of a second form which is permitted to undergo picture output to carry out picture output thereof, wherein the apparatus comprises means for converting picture data of the first form inputted without picture output instruction into picture data of the second form to hold the picture data of the second form thus obtained as predictive picture data of the second form with respect to picture data of the first form predicted to be inputted with picture output instruction later.

This invention is directed to a picture output apparatus for converting picture data of a first form, which is not permitted to undergo picture output, inputted with picture output instruction into picture data of a second form which is permitted to undergo picture output to carry out picture output thereof, wherein the apparatus comprises means for converting picture data of the first form inputted without picture output instruction into picture data of the second form to hold it, means for judging whether or not picture data of the first form inputted with picture output instruction and the picture data of the first form inputted without picture output instruction are the same, and means operative so that in the case where it is judged that the both picture data are the same, the picture output means allows the picture data of the second form already converted and held to undergo picture output as it is, while in the case where it is judged that the both picture data are not the same, the picture output means completes picture data of the second form corresponding to the picture data of the first form inputted with the picture output instruction to carry out picture output thereof.

This invention is directed to a picture output apparatus adapted for converting picture data of a first form, which is not permitted to undergo picture output, inputted with picture output instruction into picture data of a second form which is permitted to undergo picture output, wherein the apparatus comprises first holding means for holding picture data of the first form inputted without picture output instruction, second holding means for holding picture data of the second form corresponding to the inputted picture data of the first form, judgment means for judging whether or not newly inputted picture data of first form and the picture data of the first form held by the first holding means are the same, converting means operative so that in the case where the both picture data are not the same, it completes picture data of the second form corresponding to the newly inputted picture data of the first form to allow the second holding means to hold it, and means operative so that in the case where the newly inputted picture data of the first form is picture data inputted with the picture output instruction, it carries out picture output of the picture data of the second form corresponding to the picture data of the first form held by the second holding means.

This invention is directed to a picture output apparatus adapted for converting picture data of a first form, which is not permitted to undergo picture output, inputted with picture output instruction into picture data of a second form which is permitted to undergo picture output, wherein the apparatus comprises means for converting picture data of the first form inputted without picture output instruction into picture data of the second form to hold it, means for extracting difference between the picture data of the first form inputted with picture output instruction and the picture data of the first form inputted without picture output instruction, and means operative so that in the case where no difference is extracted, the picture output means allows the picture data of the second form already converted and held to undergo picture output as it is, while in the case where difference is extracted, the picture output means converts only the difference into picture data of the second form to overwrite it on the picture data of the second form already converted and held to carry out picture output thereof.

This invention is directed to a picture output apparatus adapted for converting picture data of a first form, which is not permitted to undergo picture output, inputted with picture output instruction into picture data of a second form which is permitted to undergo picture output, wherein the apparatus comprises first holding means for holding picture data of the first form inputted without picture output instruction, second holding means for holding picture data of the second form corresponding to the inputted picture data of the first form, difference extraction means for extracting difference between newly inputted picture data of the first form and the picture data of the first form held by the first holding means, converting means operative so that in the case where difference is extracted, it converts only the difference into picture data of the second form to overwrite it on the picture data of the second form held by the second holding means, and means operative so that in the case where the newly inputted picture data of the first form is picture data inputted with the picture output instruction, it carries out picture output of the picture data of the second form corresponding to the picture data of the first form held by the second holding means.

Preferably, the picture output apparatus further comprises cache means in which a character code included in the inputted picture data of the first form is converted into picture data of the second form, it registers in combination the character code and the corresponding picture data of the second form.

Moreover, preferably, the picture output apparatus further comprises means for making a request to transfer the picture data of the first form without the picture output instruction at a predetermined timing.

This invention is directed to a picture preparation apparatus adapted for delivering picture data of a predetermined form desired to be caused to undergo picture output to a picture output unit along with picture output instruction, wherein the apparatus comprises means for transferring picture data at that time point at a predetermined timing without picture output instruction, prior to transferring the picture data along with picture output instruction, with respect to the picture output unit.

This invention is directed to a picture output method in which a picture preparation unit transferrs picture data of a first form which is not permitted to undergo picture output along with picture output instruction to a picture output unit, and the picture output unit converts the transferred picture data of the first form into picture data of a second form which is permitted to undergo picture output to carry out picture output thereof, wherein a procedure is taken to transfer picture data at that time point without picture output instruction at a predetermined timing prior to transferring the picture data of the first form along with picture output instruction with respect to the picture output unit from the picture preparation unit to allow the picture output unit to convert the picture data of the first form transferred without picture output instruction into picture data of the second form to hold it as predictive picture data of the second form with respect to picture data of the first form predicted to be inputted with picture output instruction later.

This invention is directed to a picture output method in which a picture preparation unit converts picture data of a first form which is not permitted to undergo picture output prepared by using picture preparation application into picture data of a second form which is permitted to undergo picture output to transfer it in accordance with picture output instruction given from the external, and the picture output unit carries out picture output of the transferred picture data of the second form, wherein a procedure is taken to convert picture data of the first form at that time point into picture data of the second form at a predetermined timing for a time period during which picture preparation application is not continuously operative prior to transferring the picture data of the second form in a form responsive to picture output instruction given from the external to hold it as predictive picture data of the second form with respect to picture data of the first form predicted to be inputted with picture output instruction later.

Preferably, the picture preparation apparatus may comprise transfer signal generating means for sequentially generating transfer signals at predetermined timings before reception of the picture output instruction, and data transfer means operative so that when it receives the transfer signal, it transfers picture data of the first form at that time point to the picture output unit. Moreover, preferably, this transfer signal generating means may generate the transfer signal at a predetermined time period. Further, the transfer signal generating means may include a counter for carrying out count operation on the basis of a clock signal, whereby when the count value becomes equal to a predetermined value, it generates the transfer signal. In addition, this counter includes CPU state observation means for observing the state of CPU. This CPU state observation means may be such that while the CPU is carrying out operation of picture data preparation application, it generates busy signal, and when the counter receives the busy signal, it resets the count value.

In accordance with this invention, when picture data of the first form (e.g., page description language form) without picture output instruction is inputted, the picture output apparatus converts (develop and/or modify (transform)) this data into picture data of second form (e.g., bitmap form) to hold it. In the case where picture data of the first form with picture output instruction is then inputted to the picture output unit, and this picture data has the same content as the picture data already inputted without picture output instruction, since such data has been already converted into picture data of the second form and is held, it is possible to immediately carry out picture output without awaiting conversion processing.

In accordance with this invention, when picture data of the first form without picture output instruction is inputted, the picture output apparatus converts this picture data into picture data of the second form to hold it. In the case where picture data of the first form with picture output instruction is inputted to the picture output apparatus, and this picture data has the same content as picture data previously inputted without including picture output instruction, since this data has been already converted into picture data of the second form and is held, it is possible to immediately carry out picture output without awaiting conversion processing. Moreover, in the case where the picture data of the first form inputted including picture output instruction has not the same content as the picture data previously inputted without including picture output instruction, an approach is employed to convert all of inputted picture data of the first form for a second time, or to convert only the portion corresponding to difference to carry out necessary processing such as overwriting or deletion, etc. with respect to the picture data of the second form already converted and held, etc. to complete picture data of the second form corresponding to the picture data of the first form inputted including the picture output instruction thereafter to carry out picture output.

In accordance with this invention, when picture data of the first form without picture output instruction is inputted, the picture output apparatus converts it into picture data of the second form to hold it. In the case where picture data of the first form without picture output instruction are successively inputted many times, picture data of the second form corresponding to the picture data of the first form inputted last is held. Namely, in the case where such picture data has the same content as picture data inputted before and after without including picture output instruction, since this picture data has been already converted into picture data of the second form and is held, no conversion processing is carried out. In contrast, in the case where such picture data has not the same content, an approach is employed to convert all of inputted picture data of the first form for a second time, or to convert only the portion corresponding to difference to carry out necessary processing such as overwriting or deletion, etc. with respect to the picture data of the second form already converted and held, thus to complete picture data of the second form corresponding to the picture data of the first form inputted last.

In the case where picture data of the first form with picture output instruction is then inputted to the picture output apparatus, and this picture data has the same content as that of the picture data which has been previously inputted with no picture output instruction, since this picture data has been already converted into the picture data of the second form and is held, it is possible to immediately carry out picture output without awaiting conversion processing. On the other hand, in the case where the picture data of the first form inputted with picture output instruction has not the same content as that of the picture data which has been previously inputted with no picture output instruction, an approach is employed to convert all of the inputted picture data of the first form for a second time, or to convert only the portion corresponding to difference to carry out necessary processing overwriting or deletion, etc. with respect to the picture data of the second form already converted and held to complete picture data of the second form corresponding to the picture data of the first form inputted with the picture output instruction thereafter to carry out picture output thereof.

In accordance with this invention, the picture output apparatus is operative so that when picture data of the first form with no picture output instruction is inputted, it converts such picture data into picture data of the second form to hold it. Thereafter, when picture data of the first form with picture output instruction is inputted to the picture output apparatus, this apparatus extracts difference between the picture data and the previously inputted picture data with no picture output instruction. In the case where there is no difference therebetween so that the both picture data have the same content, since the picture data has been already converted into the picture data of the second form and is held, it is possible to immediately carry out picture output without awaiting conversion processing. Even in the case where difference is extracted, only the difference is converted into picture data of the second form to only overwrite it on the picture data of the second form already converted and held, thereby making it possible to carry out picture output at a speed higher than the prior art.

In accordance with this invention, the picture output apparatus is operative so that when picture data of first form with no picture output instruction is inputted, the apparatus converts it into picture data of the second form to hold it. Thereafter, when picture data of the first form is further inputted, the apparatus extracts difference between the picture data and the picture data previously inputted with no picture output instruction. Further, the apparatus converts only the extracted difference into picture data of the second form to overwrite it on the picture data of the second form already converted and held. In the case where there is no difference therebetween so that both picture data have the same content, no conversion processing is carried out.

In the case where picture data of the first form with no picture output instruction are successively inputted many times, the picture output apparatus repeats the above-mentioned processing to hold picture data of the second form corresponding to picture data of the first form inputted last.

When picture data of the first form with picture output instruction is ultimately inputted, the picture output apparatus extracts difference between the picture data and the picture data which has been previously inputted with no picture output instruction similarly to the above. In the case where there is no difference therebetween so that both picture data have the same content, since the picture data has been already converted into picture data of the second form and is held, it is possible to immediately carry out picture output without awaiting conversion processing. Even in the case where difference is extracted, only the difference is converted into picture data of the second form to only overwrite it onto the picture data of the second form already converted and held, thereby making it possible to carry out a picture output at a speed higher than the prior art.

In accordance with this invention, the picture preparation apparatus is operative to transfer, prior to transferring picture data of a predetermined form desired to undergo picture output by designation of user to the picture output unit along with picture output instruction, picture data at that time point at a predetermined timing with no picture output instruction. Accordingly, if there is prepared at the picture output side the state where picture output can be provided with respect to the previously given picture data, in the case where picture data transferred in accordance with designation of user is the same as the picture data previously transferred, it is possible to immediately provide picture output.

In accordance with this invention, the picture preparation apparatus transfers, to the picture output unit therefrom, prior to transferring picture data of a predetermined form desired to be caused to undergo picture output by designation of user to the picture output unit along with picture output instruction, picture data at that time point at a predetermined timing with no picture output instruction. The picture output unit is operative so that when picture data of the first form with no picture output instruction is inputted, the picture output unit converts it into picture data of the second form to hold it. Thereafter, picture data of the first form with picture output instruction is inputted to the picture output unit. In the case where this picture data has the same content as that of the picture data previously inputted with no picture output instruction, since the picture data has been already converted into picture data of the second form and is held, it is possible to immediately carry out picture output thereof without awaiting conversion processing.

In accordance with this invention, the picture preparation apparatus converts, prior to transferring, to the picture output unit (e.g., dump printer) therefrom, picture data of the second form, which is permitted to undergo picture output, desired to be caused to undergo picture output by designation of user to the picture output unit along with picture output instruction, picture data of the first form at that time point into picture data of the second form at a predetermined timing. In the case where picture output instruction is delivered to the picture preparation apparatus from the external after that, when the picture data of the first form to be subjected to picture output has the same content as that of the first picture data which has provided basis of data previously converted into the picture data of the second form without awaiting picture output instruction, since the picture data has been already converted into picture data of the second form and is held, it is possible to immediately transfer the picture data to the picture output unit without awaiting conversion processing thus to carry out picture output thereof.

Moreover, since the picture preparation apparatus is constructed so that it carries out the above-mentioned operation for a time period during which picture preparation application is not continuously operative, there is no possibility that execution of the picture preparation application is prevented by the above-mentioned operation. Accordingly, user can desirably use picture preparation application without feeling of disagreement as compared to the prior art.

As described above, in accordance with this invention, output time from the time when picture output instruction by user is inputted to the time when picture output is started can be reduced (fast response can be realized).

In accordance with this invention, an approach is employed to convert picture data of the first form with no picture output instruction into picture data of the second form to hold it. Accordingly, in the case where picture data of the first form which is same as above is inputted with picture output instruction after that, it is possible to immediately carry out picture output by the picture data of the second form already held without awaiting the conversion processing.

In addition, even if the picture data of the first form inputted with picture output instruction is not the same as the picture data of the first form previously inputted, conversion processing is carried out only with respect to that difference to only carry out such a reflecting operation to overwrite the result on the picture data of the second form already held, thus making it possible to carry out picture output.

As stated above, in accordance with this invention, the output time from the time when picture output instruction by user is inputted until picture output is started can be reduced.

BRIEF DESCRIPTION OF THE DRAWINGS

In the accompanying drawings:

FIGS. 1A and 1B are views showing the configuration of a picture output system according to a first embodiment of this invention;

FIGS. 7A and 7B are views for explaining, in a comparative manner, incomplete picture data and predictive picture data;

FIGS. 8A and 8B are views for explaining, in a comparative manner, incomplete picture data and predictive picture data;

FIGS. 9A and 9B are views for explaining, in a comparative manner, incomplete picture data and predictive picture data;

FIG. 12 is a view showing hardware configuration of the picture output system;

FIG. 13 is a view showing the configuration of a picture output system according to a third embodiment of this invention;

FIG. 14 is a view showing hardware configuration of the picture output system of FIG. 13;

FIG. 16 is a view showing the configuration of a picture output system according to a fifth embodiment of this invention, in which a picture preparation apparatus and picture output apparatus are provided;

FIG. 17 is a view showing the configuration of a picture output system according to a sixth embodiment of this invention, in which a picture preparation apparatus and picture output apparatus are provided, and a command analysis section is provided in the picture preparation apparatus; and FIG. 18 is a view showing the configuration of a picture output system according to a seventh embodiment of this invention.

DETAILED DESCRIPTION OF THE PREFERRED EMBODIMENTS

Figure 2:
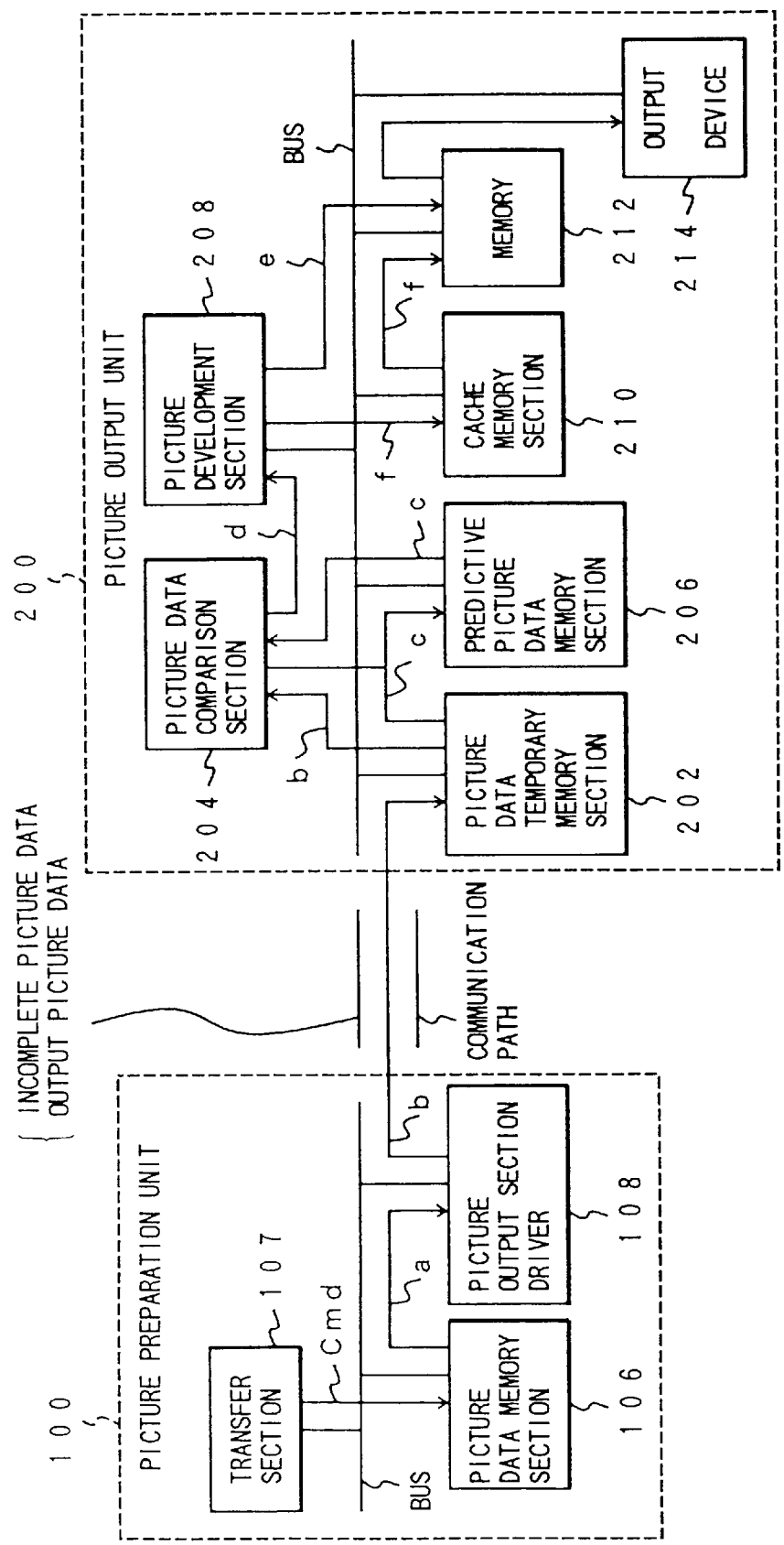
FIG. 2 is a view showing hardware configuration of the picture output system.

Preferred embodiments of this invention will now be described with reference to the attached drawings.

While the case of printer is used as a more practical example of a picture output apparatus (picture output unit) in the description of the embodiments, this invention can be also applied, in addition to the printer, to picture recording (memory) units such as digital copy machine or FAX, etc., picture display unit such as display, etc., and the like.

FIGS. 1A and 1B show a picture output system according to a first embodiment of this invention.

This picture output system essentially comprise a picture preparation unit 100 for preparing picture data as shown in FIG. 1A and a picture output unit 200 for outputting picture data delivered thereto as shown in FIG. 1B.

Explanation will now be given in this embodiment in connection with the case where the picture preparation unit 100 is realized on host computer 300 and the picture output unit 200 is realized as picture output unit (e.g., picture recording unit such as printer, digital copy machine, FAX, etc., or picture display unit such as display, or the like).

On the host computer 300, picture preparation application (indicated at 102 in the figure), which is application software of word processor, etc. for preparing picture data, can run. User utilizes this picture preparation application 102 to prepare picture data. In this case, the fundamental unit of picture data is "character code", "graphic command", and "image data". The picture data is data in which the "character code", "graphic command" and "image data" are arbitrarily combined. There can be various cases, e.g., the case where only "character codes" are included, the case where "character codes" and "image data" are included, and the case where all are included. This picture preparation application 102 may be caused to have, in addition to the function of preparing picture data, e.g., the function to preserve prepared picture data into the external memory unit (not shown), etc. and/or the function to read out picture data preserved in the external memory unit (not shown), etc.

In the case where user desires to allow the picture output unit to output picture data, he inputs picture output instruction from the host computer 300. The case where the picture output instruction inputted from the host computer 300 is carried out with respect to picture preparation application 102 and the case where such picture output instruction is carried out with respect to OS on the host computer 300 like picture image copy (print of picture image displayed on display unit) are assumed (conceivable).

The picture preparation unit 100 offers picture preparation function to user by the picture preparation application 102 to hold picture data being prepared to send out, to the picture output unit 200, picture data being prepared at a predetermined timing even if there is no picture output instruction in addition to sending out, to the picture output unit 200, picture data which has been prepared in accordance with picture output instruction of user.

The picture output unit 200 essentially serves to develop/modify (transform) picture data sent from the picture preparation unit 100 into bitmap data to carry out picture output. In this embodiment, the picture output unit 200 allows picture data sent at a predetermined timing from the picture preparation unit 100 to be bitmap data which can be subjected to picture output to hold it. Further, in the case where picture data newly sent and picture data sent immediately before are the same, processing such as development or modification (transformation), etc. is omitted. In addition, in the case where difference between picture data newly sent and picture data immediately before is small, only processing such as development and/or modification (transformation), etc. corresponding to that difference is permitted to be carried out.

The configuration of the picture preparation unit 100 and the picture output unit 200 will now be described in more detail.

As shown in FIG. 1, in the first embodiment, at the picture preparation unit 100, picture preparation application 102, a picture data memory section 106, a transfer section 107, and a picture output unit driver 108 are provided.

On the other hand, in the first embodiment, at the picture output unit 200, there are provided a picture data temporary memory section 202, a picture data comparison section 204, a predictive picture data memory section 206, a picture development section 208, a cache memory section 210, a memory 212, and an output device section 204.

Outline of respective components are es follows.

The picture data memory section 106 stores picture data (1) (picture data designated at a in the figure) prepared at the picture preparation application 102.

The transfer section 107 is provided for delivering picture data being prepared which is stored in the picture data memory section 106 to the picture output unit 200 at a predetermined timing as incomplete picture data, and is operative to control of transfer of picture data (1) from the picture data memory section 106 to the picture output unit driver 108.

It is to be noted that, also in the case where picture output instruction is inputted, picture data (1) is transferred from the picture data memory section 106 to the picture output unit driver 108 as output picture data.

When picture data (1) (a in the figure) is delivered to the picture output unit driver 108 by the operation (action) of the transfer section 107 or picture output instruction, this driver 108 converts it into picture data (2) (b in the figure) in a form corresponding to the picture output unit 200 to send it to the picture data temporary memory section 202.

The picture data temporary memory section 202 temporarily stores the picture data sent from the picture output unit driver 108.

The predictive picture data memory section 206 holds, as predictive picture data (c in the figure), picture data corresponding to the picture data (2) transferred last. The predictive picture data is written into the picture data comparison section 204.

The picture data comparison section 204 compares picture data within the picture data temporary memory section 202 (incomplete picture data or output picture data) with picture data within the predictive picture data memory section 206 to prepare development picture data (d in the figure) and predictive picture data on the basis of the result (degree or difference content of different portion).

The picture development section 208 develops/modifies (transforms), by utilizing the cache memory section 210, development picture data delivered from the picture data comparison section 204 into bitmap data (e, f in the figure) corresponding to output form of the output device section 214. In dependency upon the content of picture data, the case where only development is carried out, the case where only modification (transformation) is carried out, and the case where both development and modification are carried out are conceivable. The prepared bitmap data reflects the content of the memory 212.

The cache memory section 210 caches bitmap data (f in the figure) subjected to development/modification by the picture development section 208.

The memory 212 holds the bitmap data (e in the figure) which has been subjected to development/modification by the picture development section 208.

The output device section 214 outputs (e.g., prints) bitmap data (e in the figure) within the memory 212 in accordance with picture output instruction.

The output device section 214 corresponds to, e.g., recording engine of laser printer. In this case, when all of data of desired page are written into the memory 212, the content of the memory 212 is serially sent to the output device section 214 from the corner of the page, and is outputted as picture image.

The development/modification processing will now be described by taking the example where the picture output unit (picture output apparatus) is printer. If the printer recording engine has output form of 600 dpi, the character codes and/or the graphic commands are developed into bitmap data having density of 600 dpi. Moreover, if that printer recording engine has color recording ability, the character codes and/or the graphic commands are developed into bit map data corresponding to three colors of yellow, magenta and cyan, or four colors further including black in addition to the above.

Modification processing is implemented to image data which takes the bitmap form by itself. In terms of the previously described example, if corresponding image data has density except for 600 dpi, it is subjected to enlargement/contraction into 600 dpi. Moreover, in the case where corresponding image data has gradation of 8 bits with respect to respective pixels and the gradation reproduction ability of the printer recording engine has only 3 bits with respect to respective pixels, pseudo gradation processing such as multi-value error diffusion, etc. is implemented.

In FIG. 2, the hardware configuration of the picture output system is illustrated and flows of data are indicated by thick lines.

It is to be noted that the above-mentioned components can be suitably disposed in a distributed manner in the picture preparation unit 100 and the picture output unit 200 (host computer and printer), and various embodiments are conceivable in dependency upon way of distribution. While communication path is used for picture data transfer between the picture output unit driver 108 and the picture data temporary memory section 202, and data bus is used with respect to others in FIGS. 1 and 2, in the case where other way of distribution is employed, the portion using the communication path is changed.

It is to be noted that the transfer section 107 may be realized by executing program on the host CPU 302 of the host computer 300. Moreover, the picture data comparison section 204 or the picture development section 20B may be realized by executing program on the CPU (not shown) provided in the picture output unit 200.

The operation of the picture output system will now be described.

Initially, the operation relating to the picture preparation unit 100 will be described.

At the picture preparation application 102, picture data (1) is prepared by user. This picture data is picture data of the page description language form peculiar to the picture preparation application 102 or picture data of the page description language form peculiar to OS which allows the picture preparation application to be operative.

Figures 3, 4:
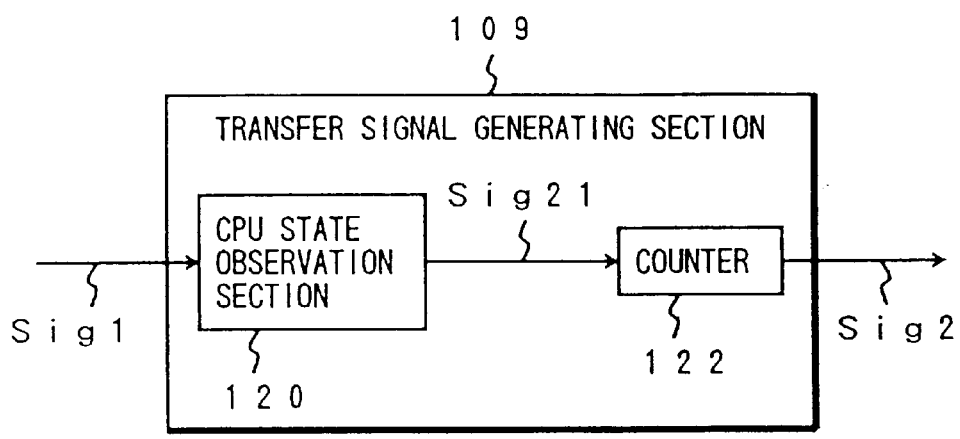
FIG. 3 is a view showing an example of picture data of page description language form.
FIG. 4 is a view showing an example of the internal configuration of transfer signal generating section.

An example of picture data of the page description language form is shown in FIG. 3. The picture data of the page description language form consists of page format (e.g., information defining resolution or blank), character code, graphic command describing graphics such as circle or square, etc., and image data described in the bitmap form like natural picture. As shown in FIG. 3, position within the page, size, rotation angle and kind such as font or line, etc. are added to the character code, the graphic command and the image data.

The picture data (1) (a in the figure) prepared at the picture preparation application 102 is stored into the picture data memory section 106 as occasion demands.

The transfer section 107 transfers, at a predetermined timing, the picture data (1) stored in the picture data memory section 106 to the picture output unit driver 108.

The transfer section 107 has, e.g., a configuration as shown in FIG. 1. A transfer signal generating section 109 outputs a transfer signal (sig 2 in the figure) at a predetermined timing on the basis of clock (not shown) from host CPU 302. An incomplete picture data transfer section 110 is operative so that when the section 110 receives this transfer signal sig 2), it sends incomplete picture transfer command (cmd in FIG. 1) to the picture data memory section 106 to transfer the picture data (1) (a in the figure) stored in the picture data memory section 106 to the picture output unit driver 108.

When explanation will be given in connection with the predetermined timing, e.g., the transfer section 107 may carry out transfer of incomplete picture data (1), e.g., every predetermined time intervals.

Moreover, in the case where the transfer section 107 is realized by program executed on the host CPU 302, when the CPU which carries out operation of the transfer section 107 (or the picture output unit driver 108) and the host CPU 302 which allows the picture preparation application 102 to be operative are shared, there occurs the cases where the operation of the picture preparation application 102 for this transfer operation is retarded. Such circumstances are inconvenient for picture preparation user. Accordingly, in order to eliminate such an inconvenience, it is desirable to carry out no transfer operation for a time period during which the host CPU 302 is subject to application operation.

Figure 5:
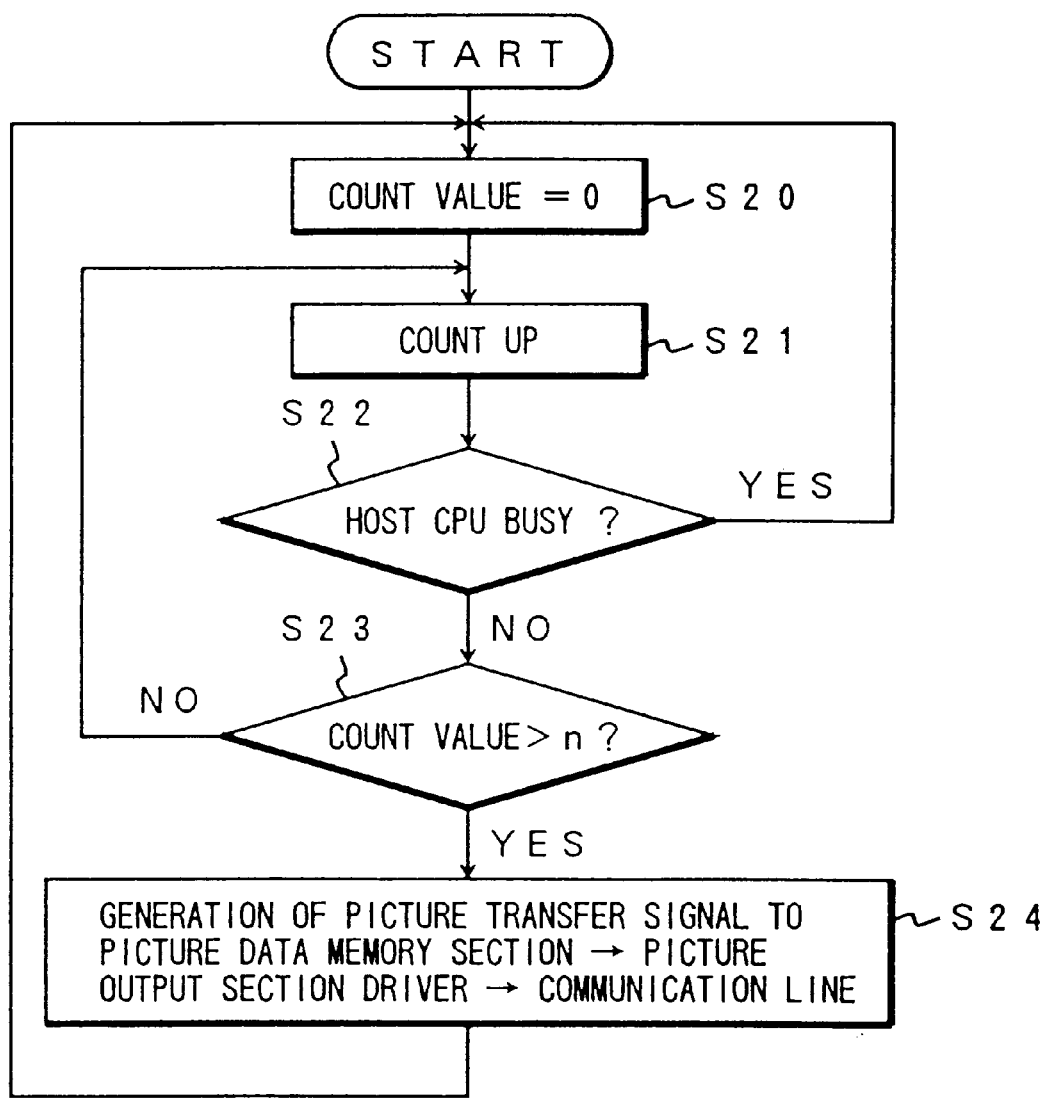
FIG. 5 is a flowchart showing flow of the operation of the transfer signal generating section of FIG. 4.

FIG. 4 shows an example of the internal configuration of the transfer signal generating section 109 which carries out an operation as described above. The operation of the transfer signal generating section 109 consisting of a CPU state observation section 120 and a counter 122 will be described below with reference to the flowchart of FIG. 5.

Initially, the count value of the counter 122 is initialized into 0 (step S20). The counter 122 counts up (or counts down) in synchronism with clock (not shown) from the host CPU 302 (step s21).

The CPU state observation section 120 receives state signal (sig 1 in the figure) from the host CPU 302 and analyzes it. When the host CPU 302 is executing instruction of picture preparation application (102), the CPU state observation section 120 generates busy signal (sig 21 in the figure) In the case where the counter 122 receives the busy signal, it resets court value (step S22).

When there is no reset by the busy signal and the count value reaches a certain value n, the counter 122 generates transfer signal (sig 2) (step S24) to reset the count value (step S20) to start count-up (or count-down) operation for a second time.

When such an approach is employed, for a time period during which the host CPU 302 counts n number of clock pulses when the host CPU 302 is executing instruction of the picture preparation application 102, or after the host CPU 302 has executed it, the incomplete picture data transfer section 110 does not carry out transfer of incomplete picture data (a in the figure), and carries out only when instruction is temporarily interrupted. Accordingly, there results no burden on the picture preparation application 102. In this case, it is desirable that user can arbitrarily select and set the counter coefficient n by keyboard input or mouse operation, etc.

When picture data (1) (a in the figure) is transferred from the picture data memory section 106 to the picture output unit driver 108, the picture data (1) is converted into picture data (2) (b in the figure) by the picture output unit driver 108. This conversion is carried out, e.g., by replacing character codes, graphic commands and image data, etc. constituting the picture data (1) by function codes or font addresses, etc. peculiar to the picture output unit 200 corresponding thereto.

It is to be noted that in the case where the picture output unit 200 can directly recognize picture data (1) (a in the figure) and development/modification at the picture development section 208 which will be described later can be carried out at a high speed, it is desirable to employ a method of sending the picture data (1) as the picture data (2) as it is without converting it.

In a manner as described above, picture data is transferred by the function (operation) of the transfer section 107 before user inputs picture output instruction (e.g., print instruction).

The picture data transferred at a predetermined timing in this way is called incomplete picture data.

On the other hand, picture data is transferred by picture output instruction by user in this picture output system, and picture data immediately after picture output instruction is called output picture data.

There are instances where the picture data prepared at the picture preparation application 102 is temporarily stored and preserved onto the external memory medium (not shown) such as hard disk or floppy disc, etc., whereupon such picture data is read in through the picture preparation application 102 for a second time and is outputted after undergone modification. Also in such a case, it is desirable that the picture data which has been read in for a second time is caused to undergo start of transfer as incomplete picture data.

Figure 6:
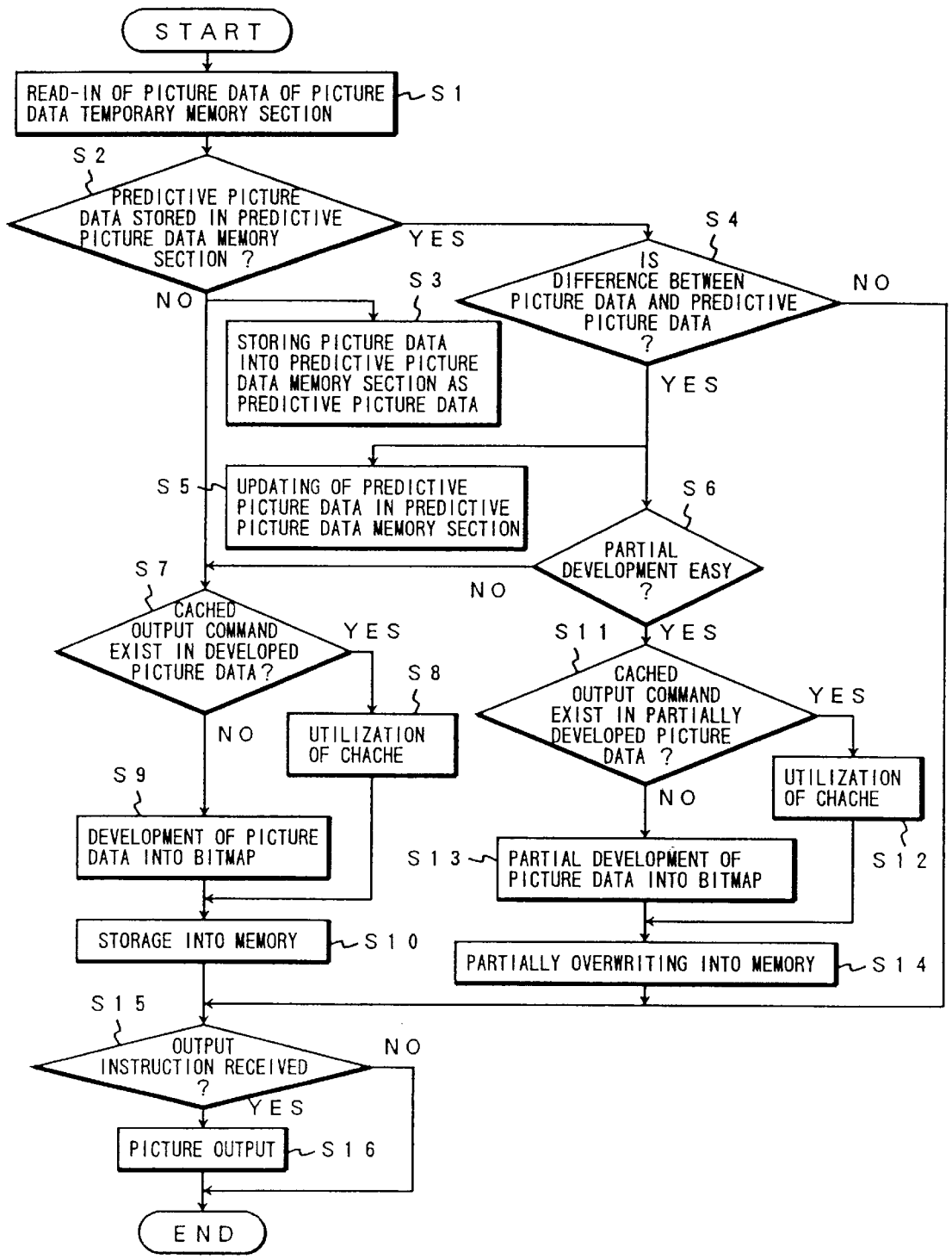
FIG. 6 is a flowchart showing an example of flow of the operation of picture output unit.

The operation relating to the picture output unit 200 will now be described with reference to the flowchart of FIG. 6.

Picture data (2) (b in the figure) are sequentially sent from the picture preparation section 100 to the picture output unit 200 at timings as described above. Explanation will be given below by taking the example where incomplete picture data are sent twice as picture data (2), and output picture data is then sent.

Initially, the first incomplete picture data (b in the figure) is sent as picture data (2), and is then temporarily stored into the picture data temporary memory section 202.

When ready signal (sig 3 in the figure) is received (transferred) from the picture data comparison section 204, the incomplete picture data is transferred to the picture data comparison section 204 (step S1).

Since any data is not stored in the predictive picture data memory section 206 at that time point (No at step S2), the incomplete picture data is sent to the picture development section 208 as development picture data (d in the figure) as it is (steps S7, S9), and is caused to undergo predictive development/modification processing into predictive bitmap data (e in the figure). The incompleted picture data thus processed is written into the memory 212 (step S10). At the same time, the predictive bitmap data (f in the figure) is written into the cache memory section 210.

In parallel thereto, the incomplete picture data is stored into the predictive picture data memory section 206 as predictive picture data (c in the figure) (step S3).

Since the picture output instruction is not involved in the case of the incomplete picture data (No at step S15), a series of processing have been completed.

Then, the second incomplete picture data (b in the figure) is sent as the picture data (2).

The picture data comparison section 204 compares the second incomplete picture data and predictive development picture data stored in the predictive development picture data memory section 206 (steps S1, S2, S4).

The incomplete picture data is converted into development picture data in dependency upon the comparison result, and is then sent to the picture development section 208.

Conversion from the incomplete picture data to the development picture data will now be described in detail with reference to FIGS. 7 and 9.

FIGS. 7A to 9B show examples of two data of incomplete picture data and predictive picture data. The picture data (2) is code peculiar to the printer, and has less redundant portion in information and is caused to easily undergo comparison.

First, in the case where the second incomplete picture data has the same content as the first incomplete picture data, comparison result of No is provided at the step S4. Processing is completed without carrying any processing.

If there is any difference at the step S4, there are a method of carrying out development/modification of the entirety of picture data similarly to the processing with respect to the first incomplete picture data and a method of carrying out partial development without applying development/modification to the entirety in dependency upon degree or difference content of different portion as described later.

In the case where the second incomplete picture data is such that new character codes and/or new graphic commands (which will be generically called output command hereinafter) are only added to predictive picture data (step S11), if only those added output commands are caused to only undergo development, etc, quantity of data to be processed can be reduced. This is effective. In the case where only the added output commands axe subjected to development, etc., the added output commands are sent to the picture development section 208 as development picture data (d in the figure), at which they are caused to undergo predictive development/modification into predictive bitmap data (e in the figure) (step S13). The predictive bitmap data thus obtained is overwritten onto the content of the memory 212. Thus, such bitmap data is reflected. (step S14). Further, the predictive bitmap data is written into the cache memory section 210. In addition, the output command is reflected by overwriting, etc. onto the content of the predictive picture data memory section 206 as predictive development picture data (step S5).

However, in the case where even if there is small difference, it is not easy to carry out reflection with respect to the memory 212 after partial development, it is sufficient to develop for a second time all output commands within the page constituting incomplete picture data.

Also in the case where there is small difference and the partial development is easy, an approach may be employed to carry out, for a second time, development, etc. of all output commands within a page constituting the incomplete picture data as described below.

In the case where all record commands of incomplete picture data are subjected to development, etc., all the incomplete picture data are sent to picture development section 208 as development picture data, at which such picture data are developed/modified into the predictive bitmap picture (data). Thus, the content of the memory 212 is completely replaced. Moreover, the predictive bitmap data is stored into the cache memory section 210. Further, the incomplete picture data is written into the predictive picture data memory section 206 as predictive picture data to replace the content thereof by that picture data (step S5).

For example, in the case where the incomplete picture data is such that a portion of the predictive picture data is missing as shown in FIGS. 8A and 8B, or a certain command exists only in the incomplete picture data and any other command exists in the predictive picture data as shown in FIGS. 9A and 9B, the content of the memory 212 or the predictive picture data memory section 206 must be partially erased, with the result that complicated processing is required (No at step S6). In this case, employment of an approach is more effective to all develop/modify incomplete picture data for a second time (steps S7, S9) to replace the content of the memory 212 by the developed/modified picture data (step S10), and to also replace the predictive picture data memory section 206 by that picture data (step S5).

Further, in the case where partial erasing is easy, bitmap data corresponding to data existing only in the predictive picture data may be erased from the memory 212. At this time, an approach is employed to also erase the content of corresponding predictive picture data to subsequently allow command only in the incomplete picture data to undergo development, etc. to overwrite the developed data onto the content of the memory 212 to add its command to the content of the predictive picture data memory section 206 as predictive picture data (c in the figure).

Since there is no picture output instruction also in the above-mentioned second incomplete picture data (No at step S15), a series of processing are completed.

It is to be noted that in the case where there exists output command cached at the step S7 or the step S11, cache is utilized as in the case of the step S8 or S12.

In the case where incomplete picture data are sent three times or more as the picture data (2), the processing in the case where the second incomplete picture data is sent is repeated.

When user finally inputs picture output instruction (e.g., print instruction in the printer device) to the host computer 300, output picture data is sent as the picture data (2) along with the picture output instruction.

The output picture data thus obtained is compared with the predictive development picture data stored in the predictive development picture data memory section 206 at the picture data comparison section 204 (steps S1, S2, S4).

In the case where the output picture data has the same content as the predictive picture data (i.e., the incomplete picture data transferred last) (Yes at step S4), any processing such as development processing, etc. is unnecessary, resulting in the state where bitmap data corresponding to the output picture data has been already stored. Accordingly, predictive bitmap data within the memory 212 is immediately sent to the output device 214 as output bitmap data. Thus, picture output is carried out (steps S15, S16).

In the case where it is judged as the result of the comparison that there exists different portion, necessary development or modification is implemented at the picture development section 208, by utilizing the cache memory section 210 if possible, similarly to the procedure when the second incomplete picture data is sent, thus to carry out write operation into the memory 212.

In this case, since the picture output instruction is received, it is sent to the output device 214 after write operation into the memory 212 is completed. Thus, picture output is carried out (steps S15, S16).

As described above, in accordance with this embodiment, the output time from the time point when the picture output instruction by user has been inputted until picture output is started can be reduced (fast response can be realized).

It is to be noted that after the picture output instruction is executed, an approach may be employed to hold the contents of respective memory sections and/or memory, or to clear those contents. In the case where there is high possibility that picture data essentially different is outputted after the picture output instruction is executed, since comparative processing can be omitted when the first incomplete picture data is received, a method of clearing those content is effective. On the other hand, in the case where there is high possibility that picture data having small different portion is edited or outputted after the picture output instruction is executed, the last output picture data is permitted to be the first incomplete picture data with respect to the subsequent picture data. Accordingly, the method of holding those contents is effective. In addition, there may be employed a method of suitably selecting and setting either of the above-mentioned methods.

Meanwhile, there are many instances where the incomplete picture data (1) prepared in the picture preparation application 102 or the output picture data (1) (a in the figure) is picture data extending over plural pages. On the contrary, the memory 212 is adapted so that bitmap data corresponding to one page can be only written from the restriction of the cost. For this reason, in the case where the incomplete picture data (2) extends over plural pages, it is desirable that incomplete picture data (2) (b in the figure) which can be outputted to the maximum degree is subjected to predictive development/modification in the memory 212. Since there are many cases where picture data is outputted ordinarily from the first page, it is desirable that picture data of the first page of the entire picture data is subjected to predictive development/modification.

Figure 10:
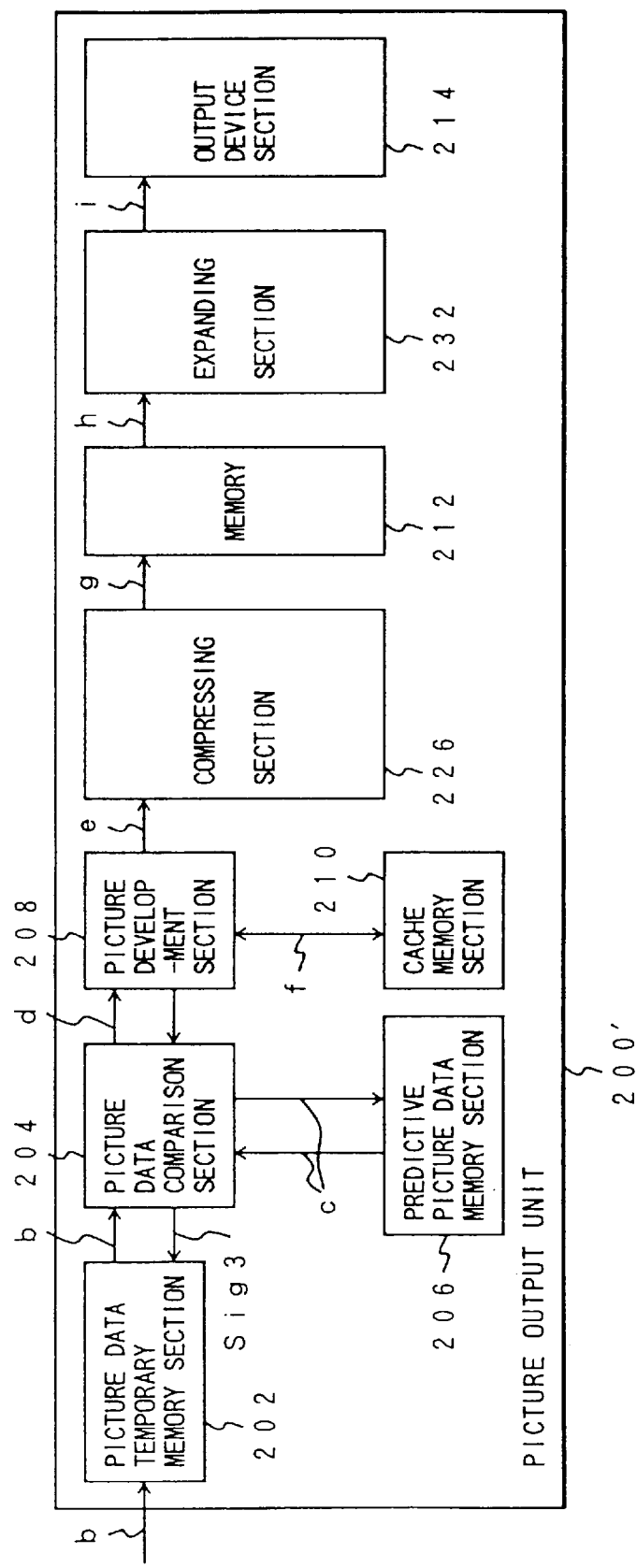
FIG. 10 is a view showing another example of the configuration of picture output unit according to the first embodiment.

As a modification of the first embodiment, a picture output system in which a compressing section 226 and an expanding 232 are provided so that capacity of the memory 212 can be reduced as shown in FIG. 10 will now be described. The compressing section 226 of a picture output unit 220' compresses bitmap data (e in the figure) of plural pages to write such bitmap data into memory 212 as far as possible as compressed data (g in the figure). After user inputs picture output instruction, if the predictive picture data (c in the figure) and the output picture data (2) (b in the figure) are in correspondence with each other, the expanding section 232 expands compressed data (h in the figure) to output the expanded data as bitmap data (i in the figure). Accordingly, it is possible to shorten the output time after the picture output instruction is inputted.

Figure 11A:
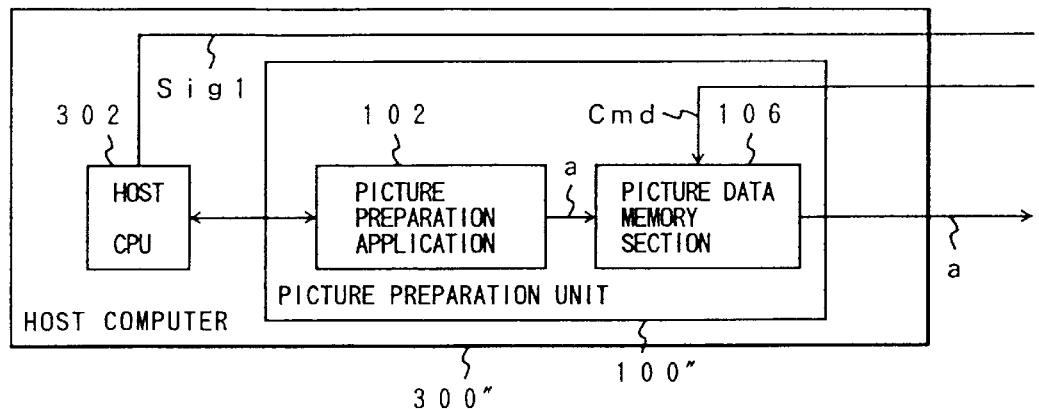
FIGS. 11A and 11B are views showing the configuration of a picture output system according to a second embodiment of this invention.
Figure 11B:
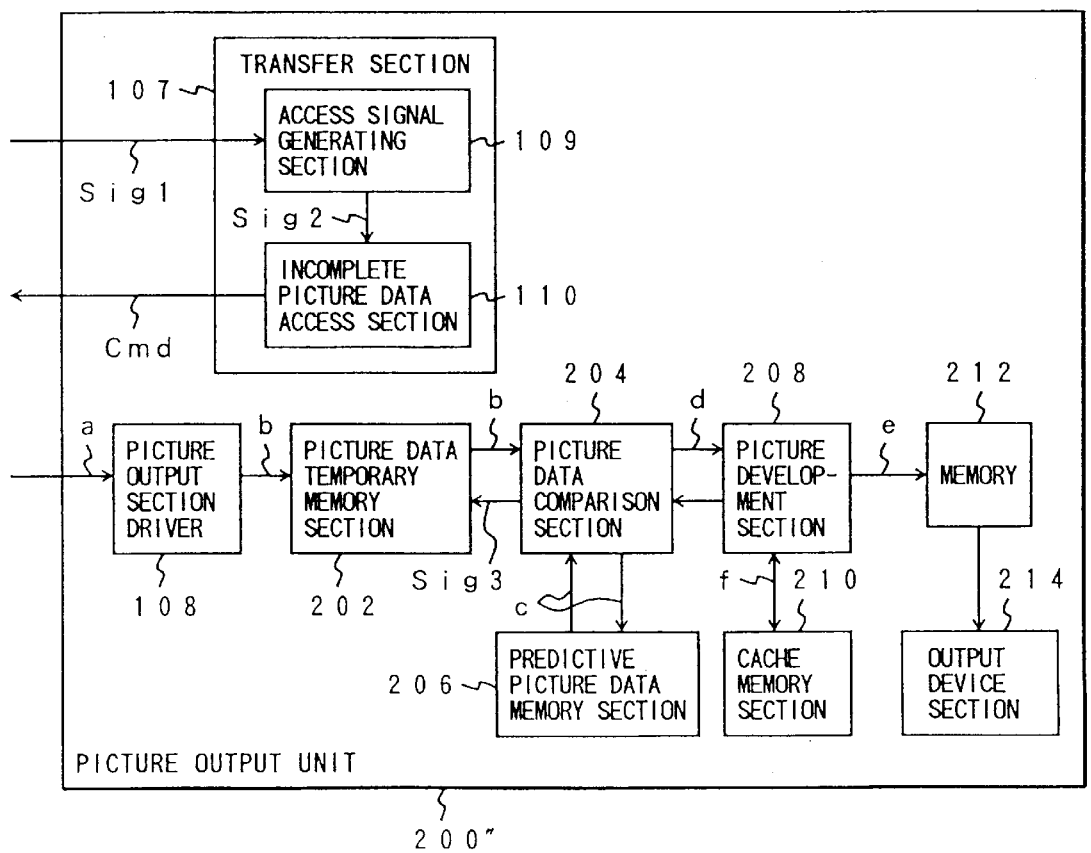

A picture output system according to a second embodiment of this invention is shown in FIG. 11.

In FIG. 12, hardware configuration of the picture output system of FIG. 11 is illustrated and flows of data are indicated by thick lines.

At the side of a picture preparation section 100", picture preparation application 102 and picture data memory section 106 are provided. At the side of a picture output section 200", transfer section 107, picture output unit driver 108, picture data temporary memory section 202, picture data comparison section 204, predictive picture data memory section 206, picture development section 208, cache memory section 210, memory 212, and output device section 214 are provided.

In the picture output system of FIG. 11, unlike the system of FIG. 1, an access signal generating section 109 (similar to the transfer signal generating section 109 of FIG. 1) and incomplete picture data access section 110 (similar to the incomplete picture data transfer section 110 of FIG. 1) are provided. This access signal generating section 109 generates access transfer signal sig 2 (similar to the transfer signal of FIG. 1) at a predetermined timing similarly to the transfer signal generating section 109 of FIG. 1. The predetermined timing mentioned here is similar to that of the transfer section 107 in the previously described embodiment. When the incomplete picture data access section 110 receives access signal sig 2, it provides an access to the picture data memory section 106 to read the picture data (1) (a in the figure) stored in the picture data memory section 106 into the picture output unit 200.

Since such a series of works are not burden on the host computer 300, application operation can be carried out at a higher speed.

A picture output system according to a third embodiment of this invention is shown in FIG. 13.

In FIG. 14, the hardware configuration of the picture output system of FIG. 13 is illustrated and flows of data are indicated by thick lines.

At the side of a picture preparation unit 100''', picture preparation application 102, picture data memory section 106, transfer section 107, picture output unit driver 108, picture data temporary memory section 202, picture data comparison section 204, predictive picture data memory section 206, picture development section 208, cache memory section 210, and memory 212 are provided. At the side of a picture output unit 200''', output device section 214 is provided.

While the first and second embodiments are directed to the case where picture development section 208, and the like relating to predictive processing are provided within picture output unit (e.g., printer), this embodiment is directed to the case where development/modification (transformation) of picture data is carried out within the host computer, and dump printer is used as the picture output unit.

It is to be noted that, in this case, there is high possibility that CPU which carries out development/modification of picture data and CPU which allows the picture preparation application to be operative are shared. In this case, it is necessary to allow the picture preparation application to be preferatially operative. Thus, no feeling of disagreement is given to user who carries out picture preparation.

Moreover, the case where printer is connected to the network so that plural users provide access to the printer, or single user uses plural picture applications is conceivable. In this case, it is desirable to have predictive picture data memory sections or memories by the number of used memories. When the number of those memories is insufficient, it is desirable to provide rank of priority between plural users or between plural applications.

It is to be noted that there may be employed such a configuration to carry out compression/expansion as shown in FIG. 10 also in the second embodiment or the third embodiment.

In addition, the picture output apparatuses according to the above-described respective embodiments can be applied also to the case where, e.g., plural moving picture data preserved in advance (or data in which difference between successive picture data is small) are caused to continuously undergo picture output.

While explanation has been given in the above-described embodiments in connection with the case where the picture preparation section is realized on the host computer 300 and the picture output unit is realized as picture output unit (e.g., printer) connected to host computer 300 through communication path, the picture preparation unit and the picture output unit may be of course integrated to provide configuration in such a form, e.g., word processor.

This invention is not limited to the above-described embodiments, but can be carried out in the state variously modified within the technical range.

Figure 15:
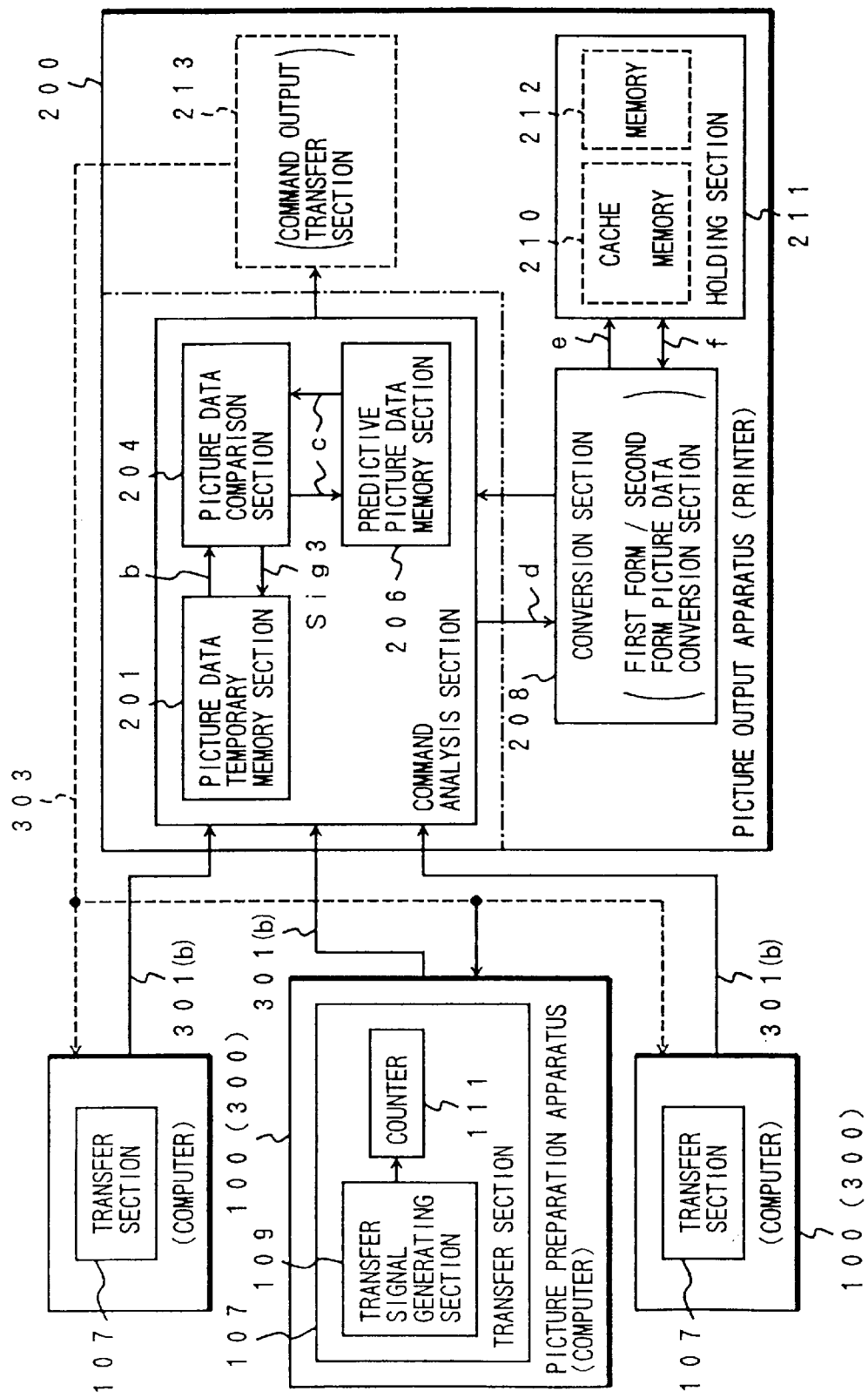
FIG. 15 is a view showing the configuration of a picture output system according to a fourth embodiment of this invention.

Next, there will be described a picture output system according to a fourth embodiment of this invention with reference to FIG. 15. A feature of the fourth embodiment resides in comprising a picture output apparatus 200 such as a printer to which a plurality of picture preparation apparatus 100 (computers 300) are connected.

In detail, picture data are transferred through data buses 301 a picture output apparatus 200 after being generated in computers 300 each of which has a predetermined image preparation application. At a transfer, there is used a transfer section 107 provided in the picture preparation apparatus 100, and the transfer section 107 comprises a transfer signal generating section 109 and a counter 111.

The picture output apparatus 200 such as printer comprises a command analysis section 201 for analyzing a picture output command attached with picture data transferred from the computer 300, a picture conversion (development) section 208 for converting the picture data from first form to second form, and a picture holding section 211 including a cache memory 210 and a memory 212.

In the command analysis section 201, the picture data temporary memory section 201 and predictive picture data memory section 206 respectively store a plurality of picture data each transferred from particular picture preparation apparatus of the plurality of computers.

Here, when the command analysis section 201 is provided on a side of the picture preparation apparatus 100, the picture output apparatus 200 includes a command transfer section 213 to transfer a picture output command from the printer side to the command analysis section 201 in the computer 300 through data buses 303 each having a direction opposite to that of the data buses 301.

The most significant feature of the present invention resides in that the picture data prepared by the picture preparation apparatus 100 are immediately transferred to the picture output apparatus to hold them under the condition capable of output, and the picture data are outputted with the smallest correction amount by comparing the holding (incomplete) picture data with the transferred picture data immediately after the picture data with the output command are transferred. Therefore, the command analysis section is provided in any of the picture output apparatus (printer) and the picture preparation apparatus (computer) to hold the predictive picture data to be outputted and which are generated from the picture data without the output command in order to rapidly output the picture data during a preparation by the command analysis section, and to output the picture data at substantially the same time of the arrival of the output command.

Accordingly, the picture data output system according to the present invention has an object to improve a transfer/accumulation of the picture data between the preparation apparatus and output apparatus, a transmission of the output command and a responsibility of the output of the picture data, by means of connecting the picture preparation apparatus and the picture output apparatus by bi-direction cables. FIGS. 16 and 17 respectively show fifth and sixth embodiments in which the picture preparation apparatus and the picture output apparatus are connected by a bi-direction cable.

FIG. 16 is a block diagram showing a picture output system according to the fifth embodiment. In FIG. 16, a picture preparation apparatus such as a computer 300 comprises at least a picture preparation section (not shown in FIG. 16) preparing picture data by using a picture preparation application, and a transfer section 107 for transferring the picture data prepared the picture preparation section. Furthermore, a picture output apparatus such as a printer 200 comprises a command analysis section 201 for analyzing as to whether or not input picture data of the first form include a picture output command, a conversion (picture development) section 208 for converting the picture data of the first form incapable of outputting a picture into picture data of a second form capable of outputting the picture even when the picture data of the first form do not include the picture output command, and a holding section 211 for holding the converted picture data of the second form corresponding to picture data of a first form which are predicted as future input picture data with a picture output command.

FIG. 17 is a block diagram showing a picture output system according to a sixth embodiment, in which a command analysts section as a feature of this invention is provided on a side of the picture preparation apparatus, and a bi-direction cable provides a connection between the picture output apparatus and the picture preparation apparatus.

In detail, in FIG. 17, a computer 300 as a picture preparation apparatus comprises a picture preparation section 100, and a command analysis section 305 for analyzing as to whether or not the picture data of the first form to be transferred include a picture output command. Furthermore, a printer 200 as a picture output apparatus comprises a conversion section 208 for converting picture data of a first form incapable of outputting a picture into a picture data of a second form capable of outputting a picture, a holding section 211 for holding a converted picture data of the second form corresponding to picture data of the first form which are predicted as a future input with a picture output command, and a transfer section 107 for transferring a command output to the picture preparation apparatus when the picture output command is included in the picture data of the first form which are transferred from the picture preparation apparatus.

At last, there will be described a picture output system according to a seventh embodiment of the present invention with reference to FIG. 18. As has been described above by using FIGS. 7A and 7B, 8A and 8B, and 9A and 9B, the picture output system according to the seventh embodiment, compares picture data of a first form on an output side transferred without a picture output command, with picture data of a first form on a preparation side transferred with a picture output command. When a difference between a preparation side and an output side is large in the comparison result, the picture data are outputted after rewriting the predictive and pre-stored picture data of the first form on the output side into picture data of a first form on the preparation side transferred with the picture output command. In this case, when the difference between the output side and preparation side is small, the picture data are outputted by superscribing and correcting the picture data of the first form on the output side previously stored in the temporary memory section 202. Since the picture data can not be outputted in the first form, the picture data are outputted after converting into the second form by the conversion section 208.

What is claimed is:

1. A picture output apparatus adapted for developing image description data which are not permitted to undergo an image output, into bitmap data which are permitted to undergo the image output, the apparatus comprising:

first holding means for holding image description data without image output instruction;

image developing means for developing said image description data without said instruction into bitmap data;

second holding means for holding said bitmap data which have been developed by said image developing means;

comparison means for comparing as to whether or not image description data inputted with the image output instruction are the same as said image description data which have already been inputted without said instruction and been held in said first holding means; and output control means, when the comparison result is that both the description data are the same as each other, for outputting said bitmap data without said instruction and which have been developed by said image developing means and held in said second holding means, and when the comparison result is that both the description data are different from each other, for outputting said image description data with said instruction after developing them into bitmap data by said image developing means and holding the developed bitmap data in said second holding means.

2. A picture output apparatus adapted for developing image description data which are not permitted to undergo an image output, into bitmap data which are permitted to undergo the image output, the apparatus comprising:

first holding means for holding image description data without image output instruction;

image developing means for developing said image description data into bitmap data;

second holding means for holding said bitmap data which have been developed by said image developing means;

comparison means for comparing as to whether or not image description data having been newly inputted are the same as said image description data which have already been held in said first holding means; and output control means, when the comparison result is that both the description data are the same as each other and when the image description data having been newly inputted are inputted with said instruction, for outputting said image description data which have been developed by said image developing means, and when the comparison result is that both the description data are different from each other and when the image description data are inputted with the image output instruction, for outputting said bitmap data with said instruction after developing them into bitmap data by said image developing means and holding them in said second holding means.

3. A picture output apparatus adapted for developing image description data which are not permitted to undergo an image output, into bitmap data which are permitted to undergo the image output, the apparatus comprising:

first holding means for holding image description data without image output instruction;

image developing means for developing said image description data without said instruction into bitmap data;

second holding means for holding said bitmap data which have been developed by said image developing means;

extracting means for extracting a difference between image description data with said instruction and image description data with said instruction;

output control means, when no difference is extracted, for outputting said bitmap data without said instruction and which have been developed by said image developing means and held in said second holding means, and when a difference is extracted, for outputting said bitmap data held in said second holding means with difference bitmap data which are developed from an image description data portion corresponding to said difference, or outputting entire bitmap data which have been developed from the image description data with said instruction by said image developing means.

4. A picture output apparatus adapted for developing image description data which are not permitted to undergo an image output, into bitmap data which are permitted to undergo the image output, the apparatus comprising:

first holding means for holding image description data without image output instruction;

image developing means for developing said image description data without said instruction into bitmap data;

second holding means for holding said bitmap data which have been developed by said image developing means;

extracting means for extracting a difference between image description data with said instruction and image description data with said instruction;

output control means, when no difference is extracted and when new image description data are inputted with said instruction, for outputting said bitmap data without said instruction and which have been developed by said image developing means and held in said second holding means, and when a difference is extracted and when image description data are inputted with said instruction, for outputting said bitmap data held in said second holding means with difference bitmap data which are developed from an image description data portion corresponding to said difference, or outputting entire bitmap data which has been developed from the image description data with said instruction by said image developing means.

5. A picture output method in which a picture preparation unit transfers, to a picture output unit, image description data which is not permitted to undergo picture output along with image output instruction, and the picture output unit develops the transferred image description data into bitmap data which is permitted to undergo picture output, the method comprising the steps of:

holding the transferred image description data at each time when image description data without said instruction are transferred at a predetermined timing from said picture preparation unit, and holding bitmap data which are developed from said image description data;

comparing, when the image description data with said instruction are transferred from said picture preparation unit, the image description data without said instruction, with the image description data without said instruction which have been previously held; and outputting the bitmap data which have been previously developed and held when the comparison result is that both the image description data are the same as each other, and outputting bitmap data which are developed from new image description data with said instruction when the comparison result is that both the description data are different from each other.

6. A picture output method in which a picture preparation unit transfers, to a picture output unit, image description data which is not permitted to undergo picture output along with image output instruction, and the picture output unit develops the transferred image description data into bitmap data which is permitted to undergo picture output, the method comprising the steps of:

preparing image description data without said instruction at a predetermined timing in said picture preparation unit, and holding the prepared image description data after developing them into bitmap data;

comparing, when said image output instruction is supplied from an outside of said picture preparation unit, image description data at that time with said image description data which have been previously held and without said instruction; and transferring, to said picture output unit, the bitmap data which have been previously developed and held when the comparison result is that both the image description data are the same as each other, and transferring, to said picture output unit, bitmap data which are developed from new image description data with said instruction when the comparison result is that both the description data are different from each other.

* * * * *